(12) United States Patent
Wang et al.

(10) Patent No.: US 10,338,460 B2
(45) Date of Patent: Jul. 2, 2019

(54) PROJECTION APPARATUS

(71) Applicant: Compal Electronics, Inc., Taipei (TW)

(72) Inventors: Wei-Jun Wang, Taipei (TW); Wen-Yi Chiu, Taipei (TW); Ting-Wei Wu, Taipei (TW); Chia-Min Liao, Taipei (TW); Tse-Hsun Pang, Taipei (TW); Kun-Hsuan Chang, Taipei (TW); Yu-Hao Tseng, Taipei (TW); Jui-Tsen Huang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 229 days.

(21) Appl. No.: 15/594,677

(22) Filed: May 15, 2017

(65) Prior Publication Data

US 2017/0344189 A1 Nov. 30, 2017

Related U.S. Application Data

(60) Provisional application No. 62/341,053, filed on May 24, 2016, provisional application No. 62/361,470, (Continued)

(51) Int. Cl.
*G03B 21/20* (2006.01)
*G06K 9/20* (2006.01)
(Continued)

(52) U.S. Cl.
CPC ....... *G03B 21/2046* (2013.01); *G03B 21/142* (2013.01); *G03B 21/2053* (2013.01); (Continued)

(58) Field of Classification Search
CPC .............. G03B 21/142; G03B 21/2046; G03B 21/2053; G06F 16/58; G06F 3/017; (Continued)

(56) References Cited

U.S. PATENT DOCUMENTS

2004/0100563 A1* 5/2004 Sablak .................... H04N 7/183
348/211.4
2005/0062939 A1* 3/2005 Tamura ................ H04N 5/7416
353/69

(Continued)

FOREIGN PATENT DOCUMENTS

CN 103914152 7/2014
CN 104656890 5/2015

*Primary Examiner* — Dmitriy Bolotin

(57) ABSTRACT

A projection apparatus includes an image projection module, a lens module and a light emitting module. The image projection module has a first optical axis and forms a projection area on a bearing surface. A projection of the first optical axis on an X-Z plane is perpendicular to an X-Y plane on which the projection area is formed. The lens module comprises N cameras, each having a corresponding second optical axis and being for forming a shooting area. The N second axes are tilted to the first optical axis and have an angle with respect to the X-Z plane. The light emitting module includes M light emitting components, each having a corresponding third optical axis and being for forming a sensing area. The projection area, the N shooting areas and the M sensing areas are at least partially overlapped with each other to form a rectangular shooting sensing area.

45 Claims, 12 Drawing Sheets

Related U.S. Application Data filed on Jul. 12, 2016, provisional application No. 62/361,477, filed on Jul. 12, 2016, provisional application No. 62/370,682, filed on Aug. 3, 2016.

(51) Int. Cl.

| | |
|---|---|
| *H04N 5/225* | (2006.01) |
| *H04N 5/232* | (2006.01) |
| *H04N 5/235* | (2006.01) |
| *H04N 5/262* | (2006.01) |
| *H04N 9/31* | (2006.01) |
| *G03B 21/14* | (2006.01) |
| *G06F 3/042* | (2006.01) |
| *H04N 5/247* | (2006.01) |
| *H04N 5/33* | (2006.01) |
| *G06F 3/0484* | (2013.01) |
| *G06F 3/0486* | (2013.01) |
| *G06F 3/0488* | (2013.01) |
| *G06F 3/16* | (2006.01) |
| *G06T 11/60* | (2006.01) |
| *G06F 3/01* | (2006.01) |
| *H04N 9/07* | (2006.01) |
| *G06F 3/0481* | (2013.01) |
| *G06F 16/58* | (2019.01) |
| *G06F 3/043* | (2006.01) |
| *G06F 3/044* | (2006.01) |
| *G06F 3/045* | (2006.01) |
| *G06K 7/14* | (2006.01) |

(52) U.S. Cl.
CPC ............ *G06F 3/017* (2013.01); *G06F 3/0425* (2013.01); *G06F 3/0484* (2013.01); *G06F 3/0486* (2013.01); *G06F 3/04817* (2013.01); *G06F 3/04842* (2013.01); *G06F 3/04883* (2013.01); *G06F 3/167* (2013.01); *G06K 9/2081* (2013.01); *G06T 11/60* (2013.01); *H04N 5/2256* (2013.01); *H04N 5/2258* (2013.01); *H04N 5/2351* (2013.01); *H04N 5/2352* (2013.01); *H04N 5/2354* (2013.01); *H04N 5/23216* (2013.01); *H04N 5/23296* (2013.01); *H04N 5/247* (2013.01); *H04N 5/2628* (2013.01); *H04N 5/33* (2013.01); *H04N 9/07* (2013.01); *H04N 9/315* (2013.01); *H04N 9/3155* (2013.01); *H04N 9/3179* (2013.01); *H04N 9/3194* (2013.01); *G06F 3/043* (2013.01); *G06F 3/044* (2013.01); *G06F 3/045* (2013.01); *G06F 3/0421* (2013.01); *G06F 16/58* (2019.01); *G06K 7/1417* (2013.01)

(58) Field of Classification Search
CPC ...... G06F 3/0421; G06F 3/0425; G06F 3/043; G06F 3/044; G06F 3/045; G06F 3/04817; G06F 3/0484; G06F 3/04842; G06F 3/0486; G06F 3/04883; G06F 3/167; G06K 7/1417; G06K 9/2081; G06T 11/60; H04N 5/2256; H04N 5/2258; H04N 5/23216; H04N 5/23296; H04N 5/2351; H04N 5/2352; H04N 5/2354; H04N 5/247; H04N 5/2628; H04N 5/33; H04N 9/07; H04N 9/315; H04N 9/3155; H04N 9/3179; H04N 9/3194

See application file for complete search history.

(56) References Cited

U.S. PATENT DOCUMENTS

| | | | |
|---|---|---|---|
| 2007/0279494 A1* | 12/2007 | Aman | G01S 3/7864 348/169 |
| 2009/0073324 A1* | 3/2009 | Tan | H04N 5/2628 348/745 |
| 2009/0116742 A1* | 5/2009 | Nishihara | G06F 3/0418 382/173 |
| 2010/0141780 A1* | 6/2010 | Tan | H04N 9/3182 348/222.1 |
| 2011/0310354 A1* | 12/2011 | Fujimori | G03B 21/13 353/31 |
| 2012/0038922 A1* | 2/2012 | Krogstad | G01J 3/505 356/402 |
| 2012/0293557 A1* | 11/2012 | Hsu | G06F 3/0386 345/672 |
| 2012/0293776 A1* | 11/2012 | Keum | H04N 9/3194 353/85 |
| 2014/0028553 A1* | 1/2014 | Harland | G06F 3/0304 345/158 |
| 2016/0057406 A1* | 2/2016 | Perriollat | G01B 11/245 348/48 |
| 2017/0347078 A1* | 11/2017 | Wang | H04N 5/2351 |

* cited by examiner

PROJECTION APPARATUS

FIELD OF THE INVENTION

The present invention relates to a projection apparatus, and more particularly to a projection apparatus having a sensing function.

BACKGROUND OF THE INVENTION

With the technical development of projector-related industry, the size of image projection module has been significantly reduced. Thus, in recent years, image projection module has been gradually integrated into other electronic products, such as interactive electronic products.

In various interactive electronic products, for example, a projector having a camera capable of detecting infrared light uses an infrared emitting module to generate an infrared curtain over the display surface. When the infrared curtain is blocked by an object (e.g., a user's finger) and a reflected spot is generated, the projector can project different display screens through the camera capable of detecting infrared light to capture the reflected spot on the display screen and then executing corresponding control commands according to the position of the reflected spot. In addition, by using a color camera to capture and identify the user's gesture, the purpose of controlling the projector to project different images of the purpose is also achieved.

Therefore, how to increase the touch control performance of interactive projectors is the focus of attention of the related persons in the field.

SUMMARY OF THE INVENTION

One objective of the present invention is to provide a projection apparatus having a better sensing operation performance.

Other objectives and advantages of the present invention will become apparent from the technical features disclosed in the present invention.

In order to achieve the above-mentioned advantages, an embodiment of the present invention provides a projection apparatus having a base and disposed on a bearing surface. The projection apparatus includes an image projection module, a lens module and a light emitting module. The image projection module has a first optical axis and is for forming a projection area on the bearing surface. A projection of the first optical axis on an X-Z projection plane of the projection apparatus is perpendicular to an X-Y projection plane of the projection apparatus on which the projection area is formed. The lens module is disposed on a side of the image projection module. The lens module comprises N cameras. The N cameras each have a corresponding second optical axis and are for forming N shooting areas respectively. The N second optical axes are tilted to the first optical axis and have N angles with respect to the X-Z projection plane respectively. A Nth angle in the N angles is $\Delta\theta an$. The projection area is at least partially overlapped with the N shooting areas to form an overlapping area. When $\Delta\theta an$ corresponding to a Nth camera among the N cameras is 0 degree, a Nth shooting area corresponding to the Nth camera on the bearing surface is a rectangle having a long side and a wide side corresponding to the base. A length of the wide side of the Nth shooting area is Yacn, and a length of the long side of the Nth shooting area is 2Xacn. The light emitting module includes M light emitting components. The M light emitting components each have a corresponding third optical axis and are for forming M sensing areas respectively. The first optical axis is located between the M sensing areas. The projection area, the N shooting areas and the M sensing areas are at least partially overlapped with each other to form a rectangular shooting sensing area. The rectangular shooting sensing area has a long side and a wide side corresponding to the base. A length of the wide side of the rectangular shooting sensing area is greater than or equal to Yacn.

In one embodiment of the present invention, the projection apparatus further has a reference plane. The image projection module and the lens module are located on the same reference plane.

In one embodiment of the present invention, the image projection module and the bearing surface have a first vertical distance Zap. A length of a long side of a projection of the image projection module on the X-Y projection plane is 2Xap. The Nth camera and the bearing surface have a second vertical distance Zacn. A distance between the image projection module and the Nth camera is Dan.

In one embodiment of the present invention, the N cameras are linearly arranged.

In one embodiment of the present invention, a value of the Nth angle $\Delta\theta an$ on the X-Z projection plane is a function of the distance between the image projection module and the Nth camera. When the shooting area of the Nth camera covers the projection area, the minimum value of $\Delta\theta an$ is $\arctan((Dan+Xap)/Zacn) - \arctan(Xacn/Zacn)$.

In one embodiment of the present invention, a size of the shooting area of at least one of the N cameras is different from that of the other cameras.

In one embodiment of the present invention, the N cameras are disposed on two sides of or around the image projection module.

In one embodiment of the present invention, the N cameras are vertically arranged with the image projection module.

In one embodiment of the present invention, a distance between a first light emitting component and a Mth light emitting component among the M light emitting components is Dam. The shooting sensing area formed by light sources of the M light emitting components is a rectangle having a long side and a wide side corresponding to the base. A length of the long side of the shooting sensing area is greater than or equal to 2 Dam.

In one embodiment of the present invention, the shooting areas formed by the N cameras include the sensing areas formed by the M light emitting components.

In one embodiment of the present invention, the N cameras of the lens module include a first camera and a second camera. The first camera is a color camera. The second camera is an infrared camera. The light emitting module is an infrared emitting module.

In one embodiment of the present invention, a projection of the first optical axis of the image projection module on a Y-Z projection plane of the projection apparatus is tilted by an angle with respect to the X-Y projection plane on which the projection area is formed.

In one embodiment of the present invention, a projection of the second optical axis of the Nth camera on a Y-Z projection plane of the projection apparatus is tilted by an angle with respect to the X-Y projection plane on which the projection area is formed.

Another embodiment of the present invention provides a projection apparatus having a base and disposed on a bearing surface. The projection apparatus includes an image projection module, a lens module and a light emitting module. The image projection module has a first optical axis and is for forming a projection area on the bearing surface. A projection of the first optical axis on a Y-Z projection plane of the projection apparatus has a first angle $\Delta\theta bp$ with respect to a Z-axis of the projection apparatus. The lens module includes N' cameras disposed on the side opposite to a tilt direction of the image projection module with respect to the Y-Z projection plane. The N' cameras each have a second optical axis and are for forming N' shooting areas respectively. The second optical axis and the Z-axis have a second angle $\Delta\theta bn$. The projection area is at least partially overlapped with the shooting areas to form an overlapping area. When the second angle $\Delta\theta bn$ corresponding to a Nth camera among the N cameras is 0 degree, a Nth shooting area corresponding to the Nth camera on the bearing surface is a rectangle having a long side and a wide side corresponding to the base. A length of the wide side of the Nth shooting area is Ybcn. A length of the long side of the Nth shooting area is 2Xbcn. The light emitting module includes M' light emitting components. The M' light emitting components each have a corresponding third optical axis and are for forming M' sensing areas respectively. The first optical axis is located between the M' sensing areas. The projection area, the N' shooting areas and the M' sensing areas are at least partially overlapped with each other to form a rectangular shooting sensing area. The rectangular shooting sensing area has a long side and a wide side corresponding to the base. A length of the wide side of the rectangular shooting sensing area is greater than or equal to Ybcn.

In one embodiment of the present invention, the image projection module projects an image toward the bearing surface to form the projection area. The image projection module and the bearing surface have a first vertical distance Zbp. A N'th camera among the N' cameras and the bearing surface have a second vertical distance Zbcn. A projection pitch of a distance between the image projection module and the N'th camera on the Y-Z projection plane is Dbn. The projection apparatus further has a reference line perpendicular to the bearing surface. The first optical axis of the image projection module and the second optical axis of the N'th camera both are tilted to the reference line. The second optical axis of the N'th camera and the reference line have the second angle $\Delta\theta bn$. When the first angle $\Delta\theta bp$ is 0 degree, the projection area projected by the image projection module is a rectangle. A length of a projection of the wide side on the Y-Z projection plane is 2Ybp.

In one embodiment of the present invention, the projection apparatus further has a reference plane. The image projection module and the N' cameras are located on the same reference plane.

In one embodiment of the present invention, a viewing angle of the image projection module is less than or equal to a viewing angle of a N'th camera among the N' cameras.

In one embodiment of the present invention, when the image projection module is tilted to the first optical axis, a projection of a distance between of the long side of the rectangular projection area on a tilted side of the first optical axis to the reference line on the Y-Z projection plane is Ybp+$\Delta$Ybcn.

In one embodiment of the present invention, the first angle $\Delta\theta bp$ between the first optical axis of the image projection module and the reference line is a default value. A value of the second angle $\Delta\theta bn$ between the second optical axis of the N'th camera on the Y-Z projection plane and the reference line is a function of a distance Dbn between the image projection module and the N'th camera on the Y-Z projection plane and of the second vertical distance Zbcn between the N'th camera and the bearing surface. When the shooting area of the N'th camera covers the projection area, the minimum value of $\Delta\theta bn$ is arctan((Dbn+$\Delta$Ybcn+Ybp)/Zbcn)–arctan(Ybcn/Zbcn).

In one embodiment of the present invention, the N' cameras include at least one color camera.

In one embodiment of the present invention, a size of the shooting area of at least one of the N' cameras is different from that of the other cameras.

In one embodiment of the present invention, the N' cameras are disposed on the side opposite to a skew angle of the image projection module.

In one embodiment of the present invention, the distance between a first light emitting component and a M'th light emitting component among the M' light emitting components is Dbm. The shooting sensing area formed by light sources of the M' light emitting components is a rectangle having a long side and a wide side corresponding to the base. A length of the long side of the rectangle is greater than or equal to 2 Dbm.

In one embodiment of the present invention, the shooting areas formed by the N' cameras include the sensing areas formed by the M' light emitting components.

In one embodiment of the present invention, a projection of the second optical axis of a N'th camera among the N' cameras on a X-Z projection plane of the projection apparatus is tilted by an angle with respect to a X-Y projection plane on which the projection area is formed.

Still another embodiment of the present invention provides a projection apparatus having a base and disposed on a bearing surface. The projection apparatus includes an image projection module, a lens module and a light emitting module. The image projection module has a first optical axis and is for forming a projection area on the bearing surface. A projection of the first optical axis on a Y-Z projection plane of the projection apparatus has a first angle $\Delta\theta cp$ with respect to a Z-axis of the projection apparatus. The lens module includes N" cameras disposed on the side identical to a tilt direction of the image projection module with respect to the Y-Z projection plane. The N" cameras each have a second optical axis and are for forming N" shooting areas respectively. The second optical axis and the Z-axis have a second angle $\Delta\theta cn$. The projection area is at least partially overlapped with the shooting areas to form an overlapping area. When the second angle $\Delta\theta cn$ corresponding to a Nth camera among the N" cameras is 0 degree, a Nth shooting area corresponding to the Nth camera on the bearing surface is a rectangle having a long side and a wide side corresponding to the base. A length of the wide side of the Nth shooting area is Yccn, and a length of the long side of the Nth shooting area is 2Xccn. The light emitting module includes M" light emitting components. The M" light emitting components each have a corresponding third optical axis and are for forming M" sensing areas respectively. The first optical axis is located between the M" sensing areas. The projection area, the N" shooting areas and the M" sensing areas are at least partially overlapped with each other to form a rectangular shooting sensing area. The rectangular shooting sensing area has a long side and a wide side corresponding to the base. A length of the wide side of the rectangular shooting sensing area is greater than or equal to Yccn.

In one embodiment of the present invention, the image projection module projects an image toward the bearing surface to form the projection area. The image projection module and the bearing surface have a first vertical distance Zcp. A N"th camera among the N" cameras and the bearing surface have a second vertical distance Zccn. A projection pitch of a distance between the image projection module and the N"th camera on the Y-Z projection plane is Dcn. The projection apparatus further has a reference line perpendicular to the bearing surface. The first optical axis of the image projection module and the second optical axis of the N"th camera both are tilted to the reference line. The second optical axis of the N"th camera and the reference line have the second angle $\Delta\theta cn$. When the image projection module is tilted to the first optical axis, a projection of a distance between of the long side of the rectangular projection area on a tilted side of the first optical axis to the reference line on the Y-Z projection plane is Ycp+Ycp1, wherein the width of Ycp+Ycp1 is equal to Dcn+$\Delta$Ycn. When the N"th camera is tilted to the respective second optical axis, a projection of a distance between of the long side of the rectangular projection area on a tilted side of the second optical axis to the reference line on the Y-Z projection plane is Yc+Ycn, wherein the width of Yc+Ycn is equal to Dcn+$\Delta$Ycn. When the first angle $\Delta\theta bp$ is 0 degree, the projection area projected by the image projection module is a rectangle, and a length of a projection of the wide side on the Y-Z projection plane is 2Ycp.

In one embodiment of the present invention, the projection apparatus further has a reference plane. The image projection module and the N" cameras are located on the same reference plane.

In one embodiment of the present invention, a viewing angle of the image projection module is less than or equal to a viewing angle of a N"th camera among the N" cameras.

In one embodiment of the present invention, the first angle $\Delta\theta bp$ between the first optical axis of the image projection module and the reference line is a default value. A value of the second angle $\Delta\theta cn$ between the second optical axis of the N"th camera on the Y-Z projection plane and the reference line is a function of a distance Dcn between the image projection module and the N"th camera on the Y-Z projection plane and of the second vertical distance Zccn between the N"th camera and the bearing surface. When the shooting area of the N"th camera covers the projection area, the minimum value of $\Delta\theta cn$ is arctan((Yc+Ycn)/Zccn)–arctan(Yc/Zccn).

In one embodiment of the present invention, the N" cameras include at least one color camera.

In one embodiment of the present invention, a size of the shooting area of at least one of the N" cameras is different from that of the other cameras.

In one embodiment of the present invention, the distance between a first light emitting component and a M"th light emitting component among the M" light emitting components is Dcm. The shooting sensing area formed by light sources of the M" light emitting components is a rectangle having a long side and a wide side corresponding to the base, and a length of the long side of the rectangle is greater than or equal to 2 Dcm.

In one embodiment of the present invention, the shooting areas formed by the N" cameras include the sensing areas formed by the M" light emitting components.

In one embodiment of the present invention, a projection of the second optical axis of a N"th camera among the N" cameras on a X-Z projection plane of the projection apparatus is tilted by an angle with respect to a X-Y projection plane on which the projection area is formed.

Yet another embodiment of the present invention provides a projection apparatus having a base and disposed on a bearing surface. The projection apparatus includes an image projection module, a lens module and a light emitting module. The image projection module has a first optical axis and is for forming a projection area. A projection of the first optical axis on a X-Z projection plane of the projection apparatus has a first angle $\Delta\theta dp$ with respect to a Z-axis of the projection apparatus. The lens module includes N''' cameras disposed on the side identical to a tilt direction of the image projection module with respect to the X-Z projection plane. The N''' cameras each have a second optical axis and are for forming N''' shooting areas respectively. The second optical axis and the Z-axis have a second angle $\Delta\theta dn$. The projection area is at least partially overlapped with the shooting areas to form an overlapping area. When the second angle $\Delta\theta dn$ corresponding to a Nth camera among the N''' cameras is 0 degree, a Nth shooting area corresponding to the Nth camera on the bearing surface is a rectangle having a long side and a wide side corresponding to the base. A length of the wide side of the Nth shooting area is Ydcn, and a length of the long side of the Nth shooting area is 2Xdcn. The light emitting module includes M''' light emitting components. The M''' light emitting components each have a corresponding third optical axis and are for forming M''' sensing areas respectively. The first optical axis is located between the M''' sensing areas. The projection area, the N''' shooting areas and the M''' sensing areas are at least partially overlapped with each other to form a rectangular shooting sensing area. The rectangular shooting sensing area has a long side and a wide side corresponding to the base, and a length of the wide side of the rectangular shooting sensing area is greater than or equal to Ydcn.

In one embodiment of the present invention, the image projection module projects an image toward the bearing surface to form the projection area. The image projection module and the bearing surface have a first vertical distance Zdp. A N'''th camera among the N''' cameras and the bearing surface have a (N'''+1)th vertical distance Zdcn. A projection pitch of a distance between the image projection module and the N'''th camera on the X-Z projection plane is Ddn. The projection apparatus further has a reference line perpendicular to the bearing surface. The first optical axis of the image projection module and the second optical axis of the N'''th camera both are tilted to the reference line. The second optical axis of the N'''th camera and the reference line have the second angle $\Delta\theta dn$. When the first angle $\Delta\theta dp$ is 0 degree, the projection area projected by the image projection module is a rectangle. A length of a projection of a wide side of the rectangular projection area on the X-Z projection plane is 2Xdp. When the image projection module is tilted to the first optical axis, a projection of a distance between of the distal wide side of the rectangular projection area on a tilted side of the first optical axis to the reference line on the X-Z projection plane is Xdp+Xdpn, wherein the width of Xdp+Xdpn is equal to Ddn+$\Delta$Xdn. When the N'''th camera is tilted to the respective second optical axis, a projection of a distance between of the distal wide side of the rectangular projection area on a tilted side of the second optical axis to the reference line on the X-Z projection plane is Xdcn+Xdn, wherein the width of Xdcn+Xdn is equal to Ddn+$\Delta$Xdpn.

In one embodiment of the present invention, the projection apparatus further has a reference plane. The image projection module and the N''' cameras are located on the same reference plane.

In one embodiment of the present invention, a viewing angle of the image projection module is less than or equal to a viewing angle of a N'''th camera among the N' cameras.

In one embodiment of the present invention, the first angle $\Delta\theta dp$ between the first optical axis of the image projection module and the reference line is a default value. A value of the second angle $\Delta\theta dn$ between the second optical axis of the N'''th camera on the X-Z projection plane and the reference line is a function of a distance Ddn between the image projection module and the N'''th camera on the X-Z projection plane and of the second vertical distance Zdcn between the N'''th camera and the bearing surface. When the shooting area of the N'''th camera covers the projection area, the minimum value of Δθdn is arctan((Xdcn+Xdn)/Zdcn)−arctan(Xdcn/Zdcn).

In one embodiment of the present invention, the N''' cameras include at least one color camera.

In one embodiment of the present invention, a size of the shooting area of at least one of the N''' cameras is different from that of the other cameras.

In one embodiment of the present invention, the distance between a first light emitting component and a M'''th light emitting component among the M''' light emitting components is Ddm. The shooting sensing area formed by light sources of the M''' light emitting components is a rectangle having a long side and a wide side corresponding to the base, and a length of the long side of the rectangle is greater than or equal to 2 Ddm.

In one embodiment of the present invention, the shooting areas formed by the N''' cameras include the sensing areas formed by the M''' light emitting components.

In one embodiment of the present invention, a projection of the second optical axis of a N'''th camera among the N''' cameras on a Y-Z projection plane of the projection apparatus is tilted by an angle with respect to a X-Y projection plane on which the projection area is formed.

In summary, according to the structural design in which the second optical axis of the plurality of lens modules is tilted to the first optical axis of the image projection module, the third optical axis of the plurality of light emitting modules is tilted to each other, and the projection area, the shooting areas and the sensing areas are at least partially overlapped with each other, the sensing performance of the projection apparatus of the embodiments of the present invention is improved.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
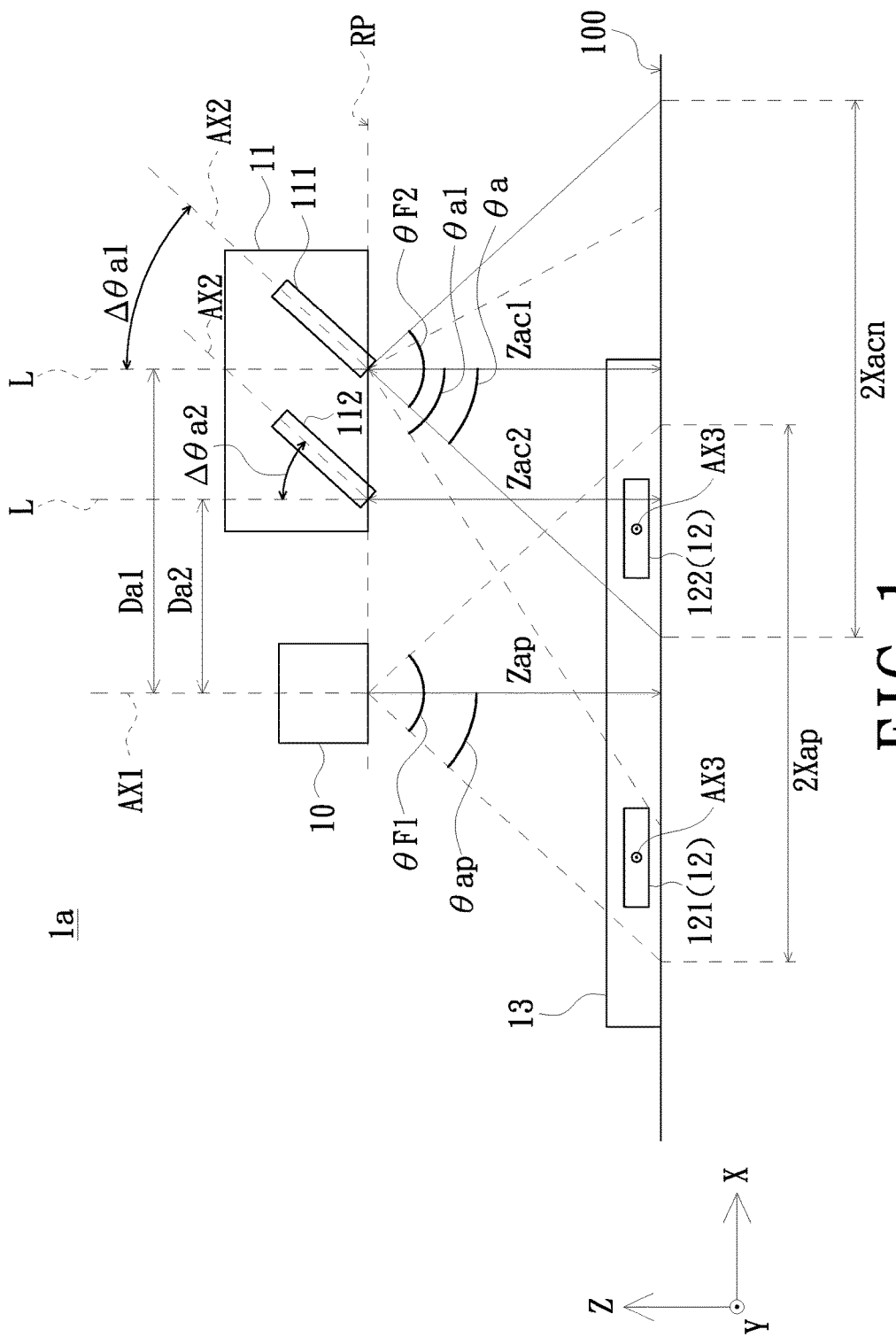
FIG. 1 is a schematic structural view of a projection apparatus in accordance with an embodiment of the present invention.
Figure 2:
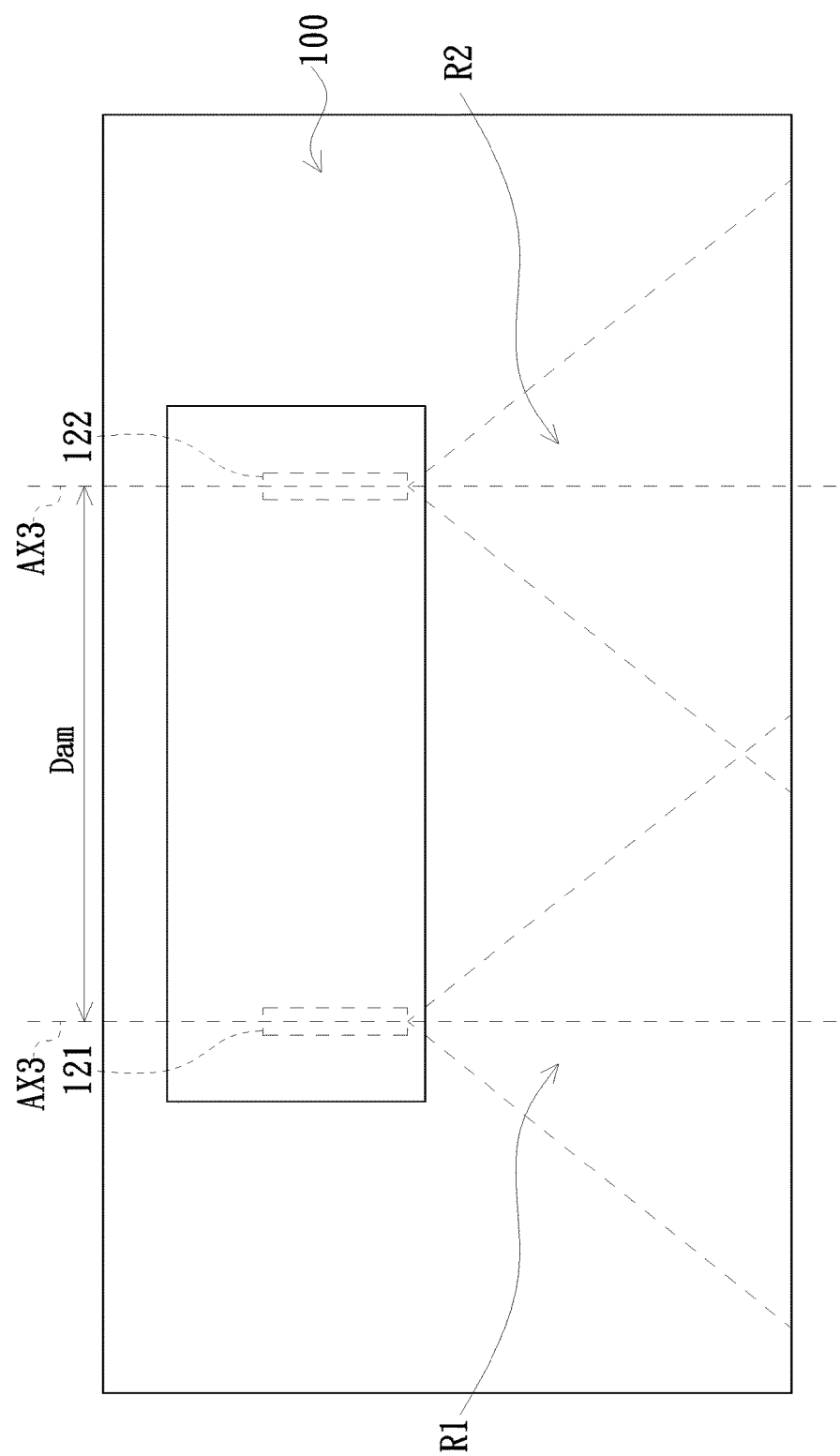
FIG. 2 is a schematic top view of a light emitting module of the projection apparatus shown in FIG. 1.
Figure 3:
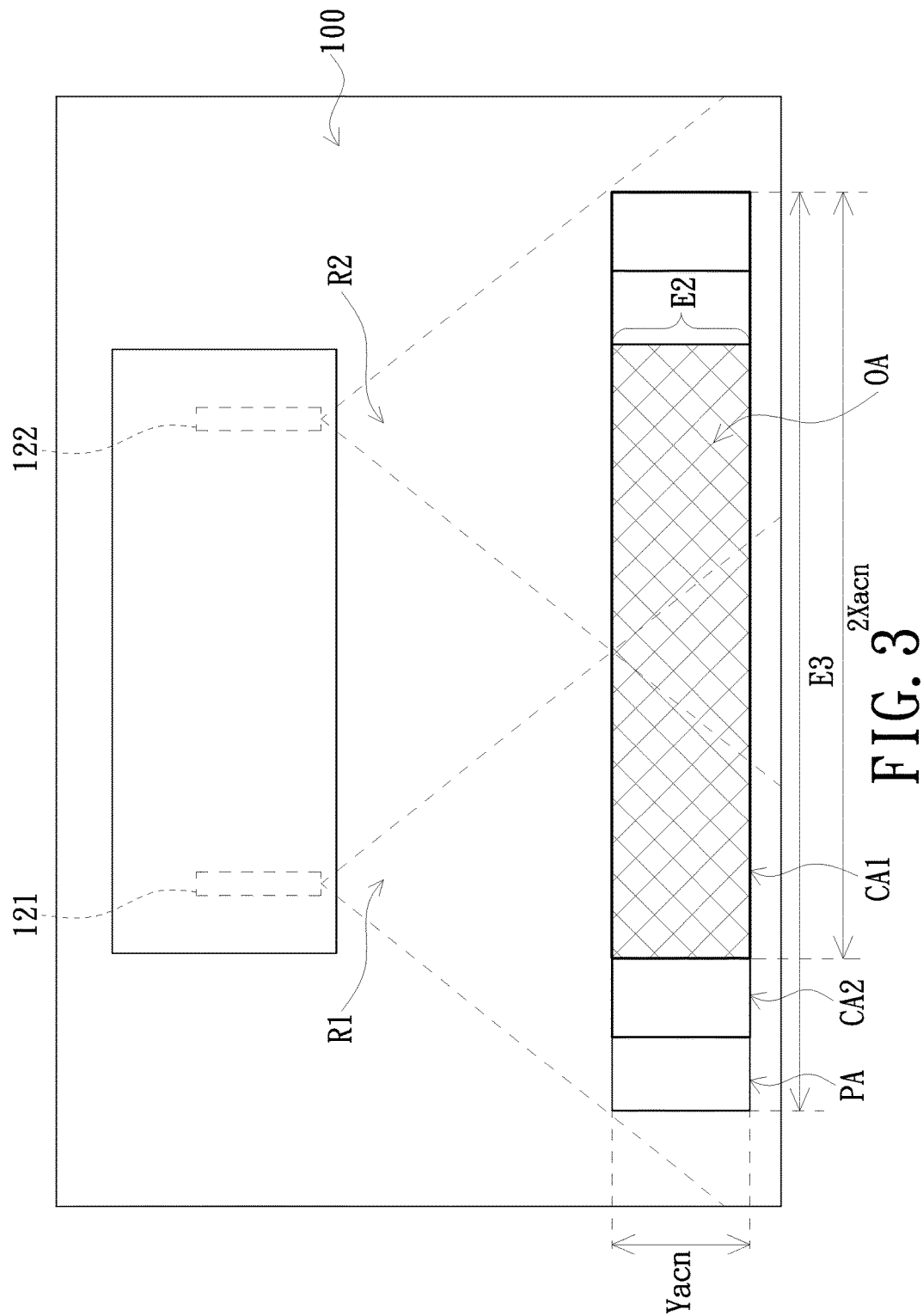
FIG. 3 is a schematic view of a projection area of an image projection module, a shooting area of a lens module and a sensing area of the light emitting module of the projection apparatus shown in FIG. 1.

Referring to FIGS. 1 to 3. FIG. 1 is a schematic structural view of a projection apparatus in accordance with an embodiment of the present invention. FIG. 2 is a schematic top view of a light emitting module of the projection apparatus shown in FIG. 1. FIG. 3 is a schematic view of a projection area of an image projection module, a shooting area of a lens module and a sensing area of the light emitting module of the projection apparatus shown in FIG. 1. As shown in FIGS. 1 to 3, the projection apparatus 1a of the present embodiment includes a base 13, and the projection apparatus 1a is placed on a bearing surface 100 by the base 13. The projection apparatus 1a further includes an image projection module 10, a lens module 11 and a light emitting module 12. The image projection module 10 has a first optical axis AX1. The image projection module 10 is for forming a projection area PA. Specifically, the image projection module 10 of the present embodiment projects an image toward the bearing surface 100 for carrying the projection apparatus 1a to form the projection area PA. The orthographic projection of the first optical axis AX1 of the image projection module 10 on the projection plane formed by the X-axis and Z-axis (X-Z projection plane) of the projection apparatus 1a is perpendicular to the projection area PA. As shown in FIG. 1, the projection area PA is the plane formed by the X-axis and the Y-axis. In addition, the orthographic projection of the first optical axis AX1 of the image projection module 10 on the projection plane formed by the X-axis and Z-axis of the projection apparatus 1a has a tilt angle with respect to the plane formed by the X-axis and Y-axis (X-Y projection plane) on which the projection area PA is formed. That is, the image projection module 10 has a rotation axis perpendicular to the plane formed by the Y-axis and Z-axis (Y-Z projection plane), and the image projection module 10 can rotate about the rotation axis.

The lens module 11 is disposed on a side of the image projection module 10. The lens module 11 includes N cameras. Each of the N cameras has a corresponding second optical axis AX2. The N cameras form N shooting areas CA1, CA2, . . . , CAn, respectively. In the present embodiment, the N cameras are described by taking a first camera 111 and a second camera 112 as an example. However, the total number of cameras is not limited in the present invention, that is, the total number of cameras can be adjusted according to the actual situation. The second optical axis AX2 of the first camera 111 and the second optical axis AX2 of the second camera 112 are tilted by the first optical axis AX1 and have angles Δθa1, Δθa2 on the X-Z projection plane, respectively. However, the tilt angle and direction of the second optical axis AX2 of camera are not limited to FIG. 1. When Δθa1=0 or Δθa2=0 (that is, when the second optical axis AX2 of the first camera 111 or the second optical axis AX2 of the second camera 112 is overlapped with a reference line L), the shooting area CA1 or CA2 formed by the first camera 111 or the second camera 112 on the bearing surface 100 is rectangle having a long side and a wide side corresponding to the base 13, wherein the length of the long side is 2Xacn (2Xac1, 2Xac2) and the length of the wide side is Yacn (Yac1, Yac2). In addition, the orthographic projections of the second optical axes AX2 of the first camera 111 and the second camera 112 on the X-Z projection plane of the projection apparatus 1a has a tilt angle with respect to the X-Y projection plane on which the projection area PA is formed. That is, the first camera 111 and the second camera 112 each have a rotation axis perpendicular to the Y-Z projection plane, and the first camera 111 and the second camera 112 each can rotate about the rotation axis.

The light emitting module 12 is disposed in the base 13. The light emitting module 12 includes M light emitting components. Each of the M light emitting components has a corresponding third optical axis AX3. The M light emitting components form M shooting areas R1, R2, . . . , Rm, respectively. The first optical axis AX1 of the image projection module 10 is located between the M sensing areas R1, R2, . . . , Rm. In the present embodiment, the M light emitting components are described by taking a first light emitting component 121 and a second light emitting component 122 as an example. However, the total number of light emitting components is not limited in the present invention, that is, the total number of light emitting components can be adjusted according to the actual situation. The projection area PA of the image projection module 10, the N shooting areas CA1, CA2, . . . , CAn of the lens module 11 and the M sensing areas R1, R2, . . . , Rm are at least partially overlapped with each other to form a rectangular shooting sensing area OA. The rectangular shooting sensing area OA has a long side and a wide side E2 corresponding to the base 13. In the present embodiment, the length of the wide side E2 is greater than or equal to the length Yacn of the wide side of the shooting area CA1, CA2, . . . , CAn.

In the present embodiment, the first camera 111 of the lens module 11 is a color camera, for example; the second camera 112 is an infrared camera, for example; the light emitting module 12 is an infrared emitting module, for example; but the present invention is not limited thereto. By the color camera (the first camera 111) capturing the gesture of the user in the first shooting area CA1 or the control action of the user on the mouse or keyboard, the image projection module 10 is controlled to project different images. In addition, by the use of an infrared camera (the second camera 112) and an infrared emitting module (the light emitting module 12), touch operation is performed on the image projection module 10. Specifically, when the user's hand enters the first sensing area R1 or the second sensing region R2 and a reflected light spot (for example, a reflected infrared spot) is generated correspondingly, the image projection module 10 is controlled to project different images through the infrared camera (the second camera 112) that captures the image containing the reflected light spot and then corresponding control commands are executed according to the position of the reflected light spot.

As shown in FIGS. 1 to 3, the projection apparatus 1a of the present embodiment further has a reference plane RP. The image projection module 10 and the lens module 11 are located on the same reference plane RP. Specifically, the image projection module 10, the first camera 111 and the second camera 112 are located on the same reference plane RP. The reference plane RP is parallel to the bearing surface 100 for example; that is, the image projection module 10 has a first vertical distance Zap with respect to the bearing surface 100, and the first camera 111 and the bearing surface 100 each have a second vertical distance Zacn with respect to the bearing surface 100. In the present embodiment, the first vertical distance Zap and the second vertical distance Zacn (Zac1, Zac2) are equal to each other, but the present invention is not limited thereto. In other embodiments, the first vertical distance Zap and the second vertical distance Zacn (Zac1, Zac2) are not equal to each other for example. In addition, the length of the long side of the projection of the image projection module 10 of the present embodiment on the bearing surface 100 (the X-Y projection plane) is 2Xap. The first camera 111 and the second camera 112 are linearly arranged, but the present invention is not limited thereto. In other embodiment, the first camera 111 and the second camera 112 are non-linearly arranged. The distance between the image projection module 10 and the first camera 111 is Da1. Specifically, the distance Da1 between the image projection module 10 and the first camera 111 is the distance between the first optical axis AX1 of the image projection module 10 and the second optical axis AX2 of the first camera 111.

As shown in FIGS. 1 to 3, the projection apparatus 1a of the present embodiment further has a reference line L perpendicular to the reference plane RP. In the present embodiment, the first optical axis AX1 of the image projection apparatus 10 is parallel to the reference line L and has a projection viewing angle θF1. The projection viewing angle θF1 is twice of a projection half-viewing angle θap. The first camera 111 and the second camera 112 are the same camera, and both have a shooting viewing angle θF2. The shooting viewing angle θF2 is twice of a shooting half-viewing angle θa of a camera. θa1 is the angle between a shooting boundary and the second optical axis AX2 after the first camera is tilted. The second optical axis AX2 of the first camera 111 and the reference line L have an angle Δθa1, therefore, Δθa1=θa1−θa. The second optical axis AX2 of the second camera 112 and the reference line L have an angle Δθa2, therefore, Δθa2=θa2−θa. That is, the projection direction of the image projection module 10 is fixed, the shooting direction of the first camera 111 has a skew angle with respect to the projection direction of the image projection module 10, and the shooting direction of the second camera 112 has another skew angle with respect to the projection direction of the image projection module 10. Therefore, the projection area PA of the image projection module 10, the shooting area CA1 of the first camera 111 and the shooting area CA2 of the second camera 112 can be at least partially overlapped with each other.

In the present embodiment, it is to be noted that the value of the angle Δθa1 between the second optical axis AX2 of the first camera 111 and the reference line L is a function of the distance Da1 between the image projection module 10 and the first camera 111. When the shooting area CA1 of the first camera 111 covers the projection area PA, the minimum value of the angle Δθa1 satisfies the equation: Δθan=θan−θa=θan−½θF2=arctan((Dan+Xap)/Zacn)−arctan(Xacn/Zacn); wherein θa=½θF2, and n represents the Nth camera. Therefore, Δθa1=θa1−θa=θa1−½θF2=arctan((Da1+Xap)/

$Zac1)-\arctan(Xac1/Zac1)$. In particular, the above-described equation is described by taking the first camera 111 as an example, but the present invention is not limited thereto. In the other embodiment, the value of the angle $\Delta\theta a2$ between the second optical axis AX2 of the second camera 112 and the reference line L is a function of the distance Da2 between the image projection module 10 and the second camera 112. When the shooting area CA2 of the second camera 112 covers the projection area PA, the minimum value of the angle $\Delta\theta a2$ satisfies the equation: $\Delta\theta a2 = \arctan((Da2+Xap)/Zac2) - \arctan(Xac2/Zac2)$.

In the present embodiment, it is to be noted that the size of the shooting area CA1 of the first camera 111 is the same as or different from the size of the shooting area CA2 of the second camera 112. In the embodiment that the lens module 11 includes more than two cameras, the size of the shooting area of at least one camera among these cameras is different from that of other cameras. In addition, the first camera 111 and the second camera 112 of the present embodiment are disposed on a side of the image projection module 10, but the present invention is not limited thereto. In one embodiment, the first camera 111 and the second camera 112 are, for example, disposed on two sides of or around the image projection module 10. In another embodiment, the first camera 111 and the second camera 112 are, for example, vertically arranged with the image projection module 10.

As shown in FIGS. 1 to 3, the distance between the first light emitting component 121 and the second light emitting component 122 in the M light emitting components of the present embodiment is Dam (Da1). The sensing area formed by the light sources of the first light emitting component 121 and the second light emitting component 122 is a rectangle having a long side E3 and a wide side corresponding to the base 13. In the present embodiment, the length of the long side E3 is, for example, greater than or equal to twice of the distance Dam (Da1). In addition, the shooting areas CA1, CA2 formed by the first camera 111 and the second camera 112 of the present embodiment include the sensing areas R1, R2 formed by the first light emitting component 121 and the second light emitting component 122, respectively.

Figure 4:
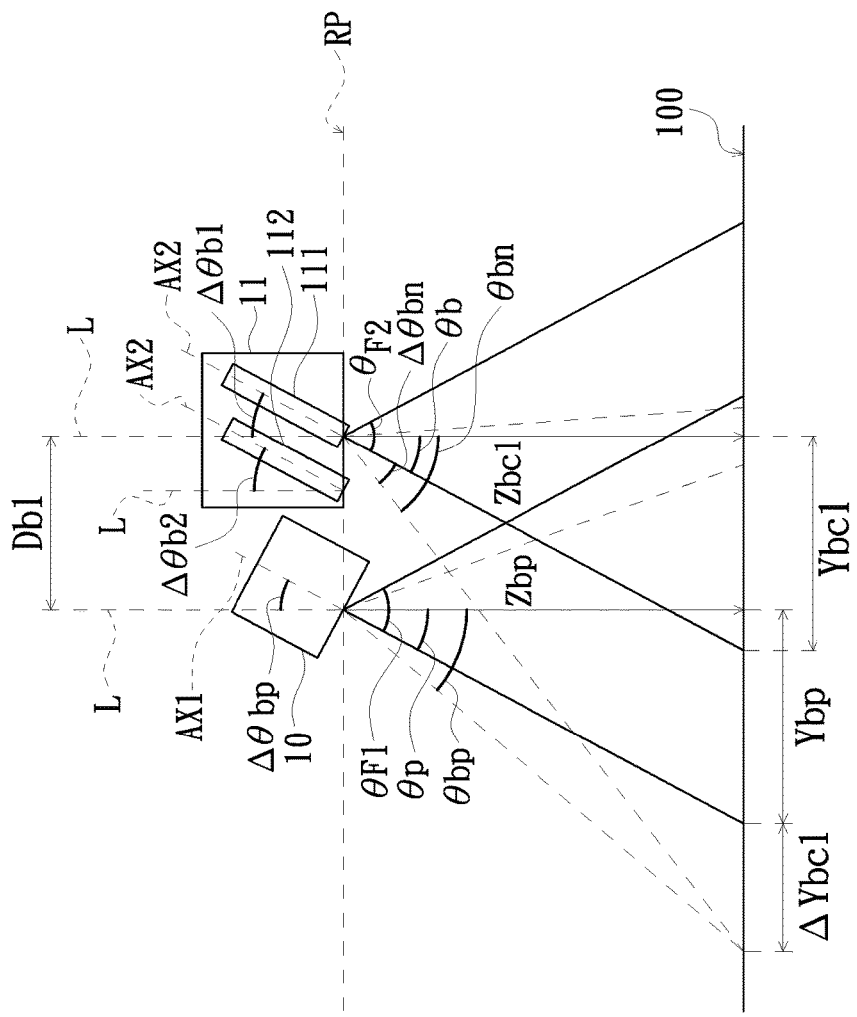
FIG. 4 is a schematic structural view of a projection apparatus in accordance with an embodiment of the present invention.
Figure 5:
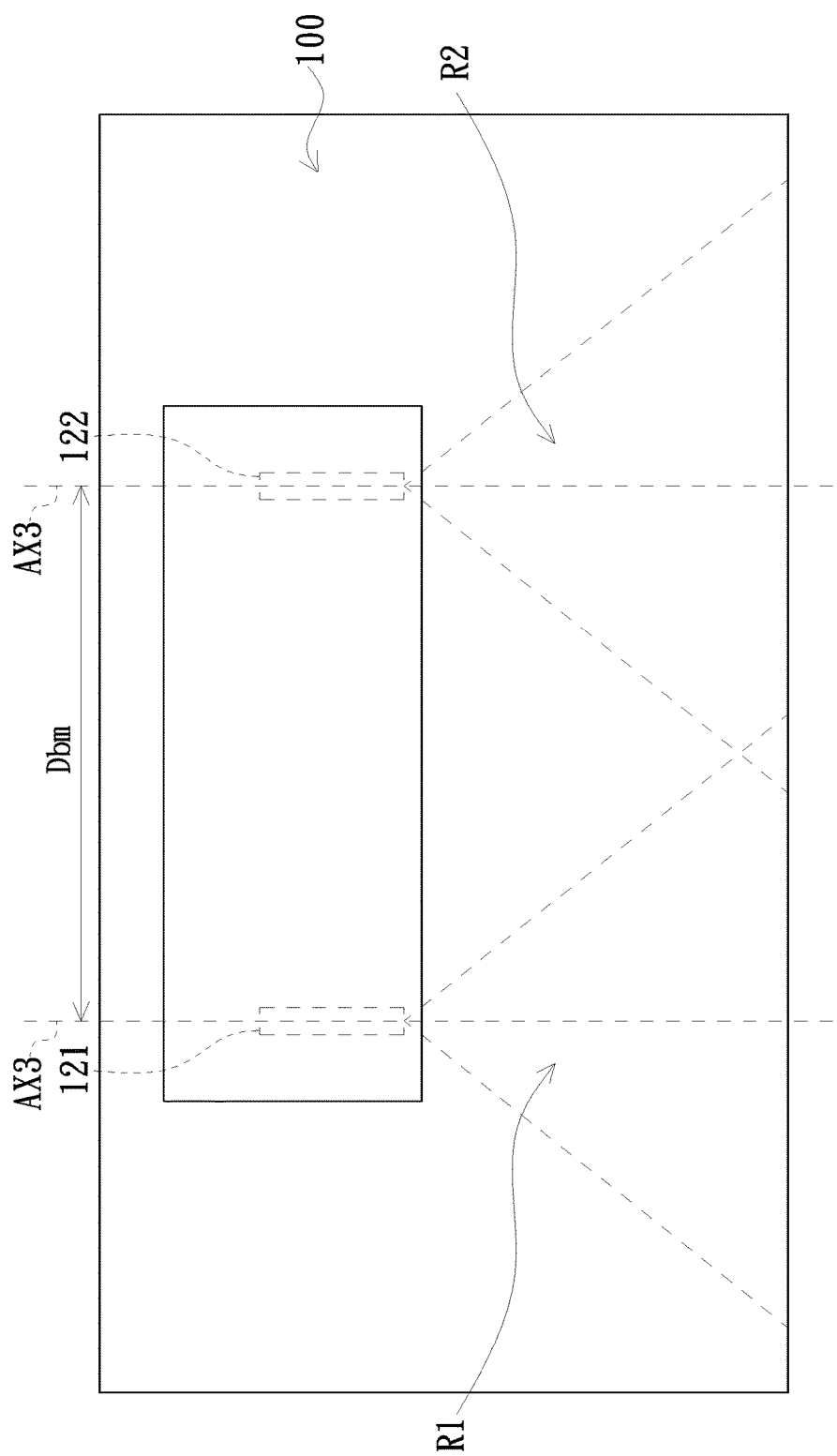
FIG. 5 is a schematic top view of a light emitting module of the projection apparatus shown in FIG. 4.
Figure 6:
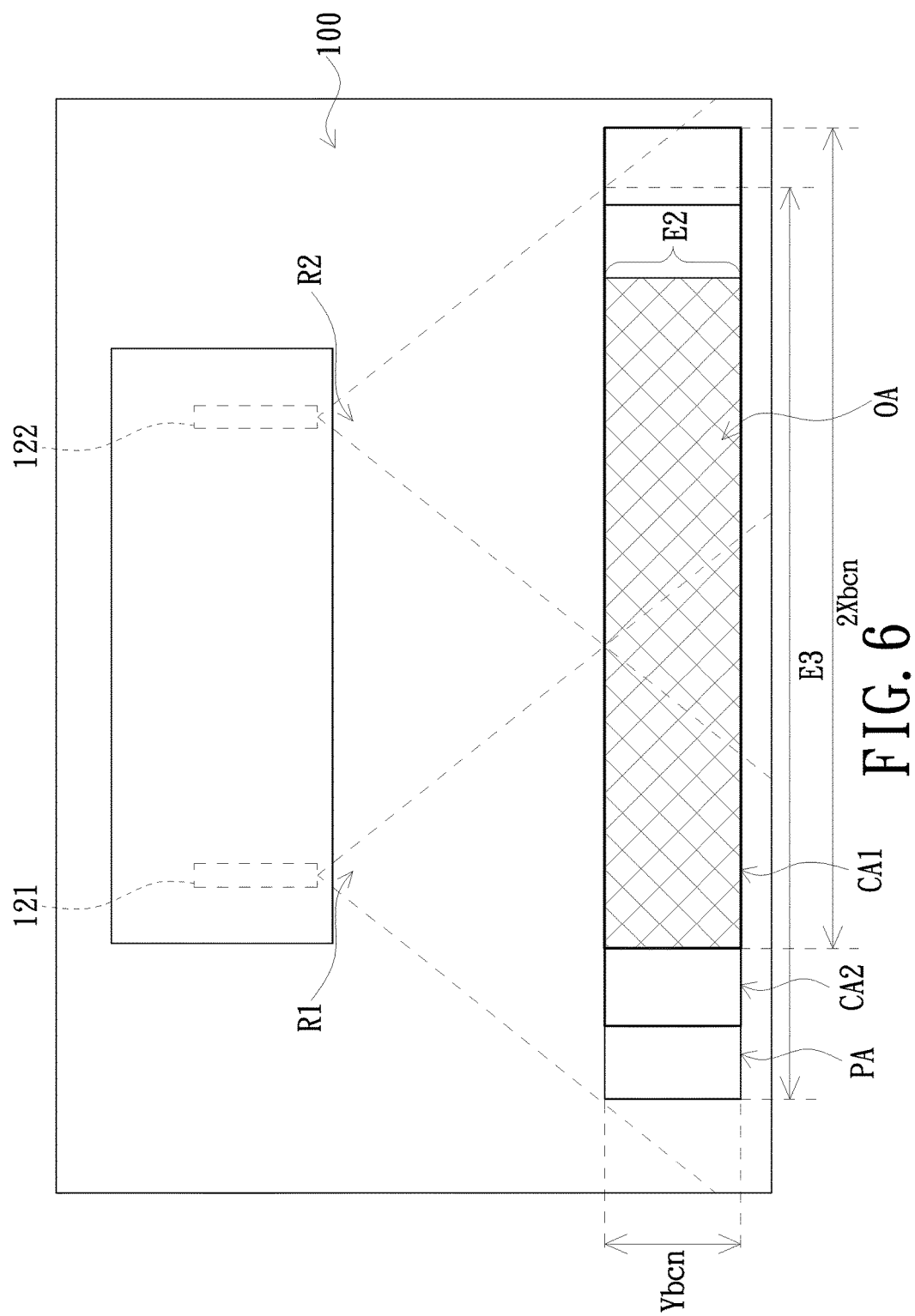
FIG. 6 is a schematic view of a projection area of an image projection module, a shooting area of a lens module and a sensing area of the light emitting module of the projection apparatus shown in FIG. 4.

Referring to FIGS. 4 to 6. FIG. 4 is a schematic structural view of a projection apparatus in accordance with another embodiment of the present invention. FIG. 5 is a schematic top view of a light emitting module of the projection apparatus shown in FIG. 4. FIG. 6 is a schematic view of a projection area of an image projection module, a shooting area of a lens module and a sensing area of the light emitting module of the projection apparatus shown in FIG. 4. As shown in FIGS. 4 to 6, the projection apparatus 1b of the present embodiment includes a base 13, and the projection apparatus 1b is placed on a bearing surface 100 by the base 13. The projection apparatus 1b further includes an image projection module 10, a lens module 11 and a light emitting module 12. The image projection module 10 has a first optical axis AX1 having a projection viewing angle $\theta F1$. The projection viewing angle $\theta F1$ is twice of a projection half-viewing angle $\theta b$. The image projection module 10 is for forming a projection area PA. Specifically, the image projection module 10 of the present embodiment projects images toward the bearing surface 100 for carrying the projection apparatus 1b to form the projection area PA. The first optical axis AX1 of the image projection module 10 has a first angle $\Delta\theta bp$ between the positive projection of the projection apparatus 1b on a projection plane formed by the Y-axis and Z-axis.

The lens module 11 is disposed on a side of the image projection module 10. The lens module 11 includes N' cameras. The N' cameras are located on the side opposite to the tilt direction of the image projection module 10 with respect to the Y-X plane. In other words, the N' cameras are arranged on the side opposite to the skew angle of the image projection module 10. In other words, each of the N' cameras has a corresponding second optical axis AX2. The N' cameras form N' shooting areas CA1, CA2. In the present embodiment, the N' cameras are described by taking a first camera 111 and a second camera 112 as an example. However, the total number of cameras is not limited in the present invention, that is, the total number of cameras can be adjusted according to the actual situation. The second optical axis AX2 of the first camera 111 and the second optical axis AX2 of the second camera 112 each have a second angles $\Delta\theta bn$ ($\Delta\theta b1$, $\Delta\theta b2$) with respect to the Z-axis. The first camera 111 and the second camera 112 are the same camera, and both have a shooting viewing angle $\theta F2$. The shooting viewing angle $\theta F2$ is twice of a shooting half-viewing angle $\theta b$ of a camera. $\theta bn$ is the angle between a shooting boundary and the second optical axis AX2 after the camera is tilted. Therefore, $\Delta\theta b1 = \theta b1 - \theta b$ and $\Delta\theta b2 = \theta b2 - \theta b$. When $\Delta\theta b1 = 0$ or $\Delta\theta b2 = 0$ (that is, when the second optical axis AX2 is overlapped with a reference line L), the shooting area CA1 or CA2 formed by the first camera 111 or the second camera 112 on the bearing surface 100 is a rectangle having a long side and a wide side corresponding to the base 13, wherein the length of the long side is 2Xbcn (2Xbc1, 2Xbc2) and the length of the wide side is Ybcn (Ybc1, Ybc2). In addition, the orthographic projections of the second optical axes AX2 of the first camera 111 and the second camera 112 are perpendicular to the X-Z projection plane of the projection apparatus 1b. That is, the first camera 111 and the second camera 112 each have a rotation axis perpendicular to the Y-Z projection plane, and the first camera 111 and the second camera 112 each can rotate about the rotation axis.

The light emitting module 12 is disposed in the base 13. The light emitting module 12 includes M' light emitting components. Each of the M' light emitting components has a corresponding third optical axis AX3. The M' light emitting components form M' shooting areas R1, R2. The N' first optical axis AX1 of the image projection module 10 is located between the M' sensing areas R1, R2. In the present embodiment, the M' light emitting components are described by taking a first light emitting component 121 and a second light emitting component 122 as an example. The distance between the first light emitting component 121 and the second light emitting component 122 is Dbm (Db1). The sensing area formed by the light sources of the first light emitting component 121 and the second light emitting component 122 is a rectangle having a long side E3 and a wide side corresponding to the base 13. In the present embodiment, the length of the long side E3 is, for example, greater than or equal to 2 Dbm (2Dba1). The projection area PA of the image projection module 10, the N shooting areas CA1, CA2 of the lens module 11 and the M' sensing areas R1, R2 are at least partially overlapped with each other to form a rectangular shooting sensing area OA. The rectangular shooting sensing area OA has a long side and a wide side E2 corresponding to the base 13. In the present embodiment, the length of the wide side E2 is greater than or equal to the length Ybcn (Ybc1, Ybc2) of the wide side of the shooting area CA1, CA2.

As shown in FIGS. 4 to 6, the image projection module 10 of the present embodiment projects an image toward the bearing surface 100 to form the projection area PA. The image projection module 10 and the bearing surface 100 have a first vertical distance Zbp. The first camera 111 and the bearing surface 100 have a second vertical distance Zbcn. The projection pitch between the image projection module 10 and the first camera 111 on the Y-Z projection plane is Dbn (Db1). The projection apparatus 1b further has a reference line L perpendicular to the bearing surface 100 and parallel to the Z-axis. In the present embodiment, the first optical axis AX1 of the image projection module 10 is tilted to the reference line L, and the second optical axis AX2 of the first camera 111 is tilted to the reference line L. The image projection module 10 and the reference line L have a first angle Δθbp. The second optical axis AX2 of the first camera 111 and the reference line L have a second angle Δθ1. When Δθbp=0, the first optical axis AX1 of the image projection module 10 is overlapped with the reference line L. The projected projection area of the image projection module 10 is a rectangular projection area. The length of the wide side of the rectangular projection area is 2Ybp on the Y-Z projection plane.

In the present embodiment, it is to be noted that the angle Δθbp between the first optical axis AX1 of the image projection module 10 and a first reference line L1 is a default value, and the value of the angle Δθbn (Δθb1) between the second optical axis AX2 of the first camera 111 and a second reference line L2 on the Y-Z projection plane is a function of the distance Dbn (Db1) between the image projection module 10 and the first camera 111 on the Y-Z projection plane and the second vertical distance Zbcn (Zbc1) between the first camera 111 and the bearing surface 100. When the shooting area of the first camera 111 covers the projection area PA, Δθbp=θbp−θp=θbp−½θF1=arctan((ΔYbcn+Ybp)/Zbp)−arctan(Ybp/Zbp). Since Δθbp, Ybp and Zbp are default values, the value of the ΔYbcn can be obtained. tan(θbn)=(Dbn+Ybp+ΔYbcn)/Zbcn, therefore, the minimum value of the second angle Δθbn satisfies the equation: Δθn=θbn−θb=θbn−½θF2=arctan((Dbn+ΔYbcn+Ybp)/Zbcn)−arctan(Ybcn/Zbcn), wherein θp=½θF2, θb=½θF2, and n represents the N'th camera. Therefore, Δθb1=arctan((Db1+ΔYbc1+Ybp)/Zbc1)−arctan(Ybc1/Zbc1).

Figure 7:
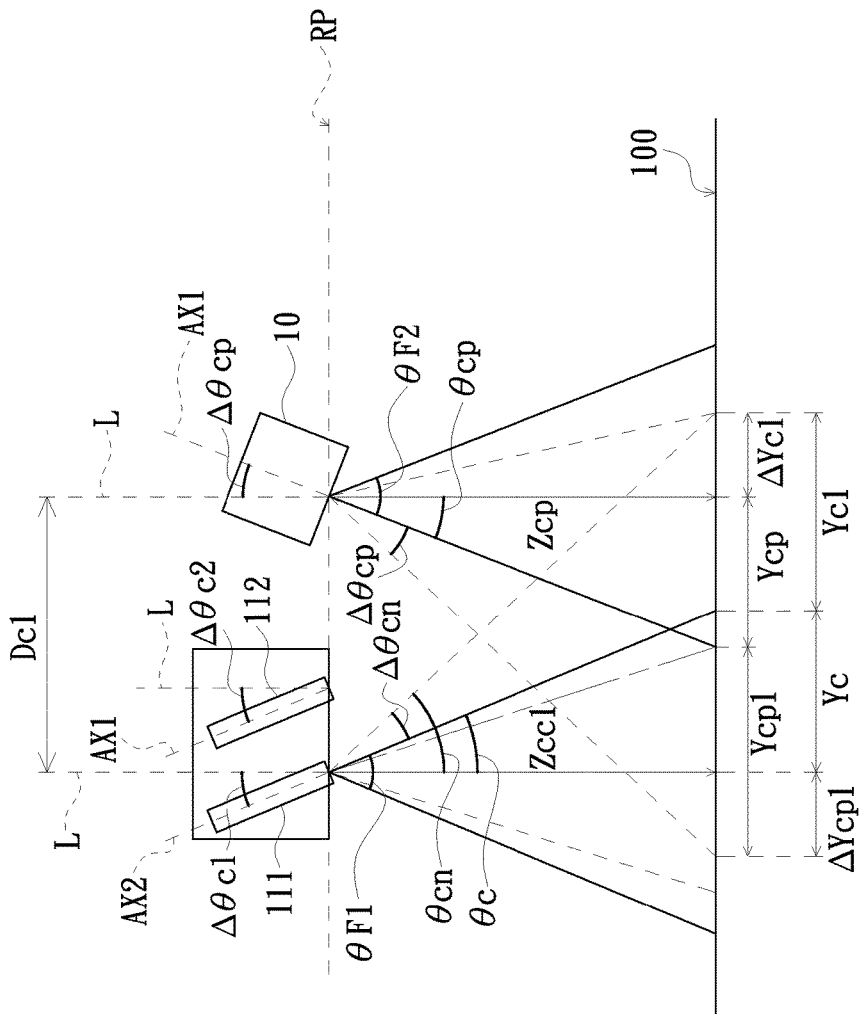
FIG. 7 is a schematic structural view of a projection apparatus in accordance with an embodiment of the present invention.
Figure 8:
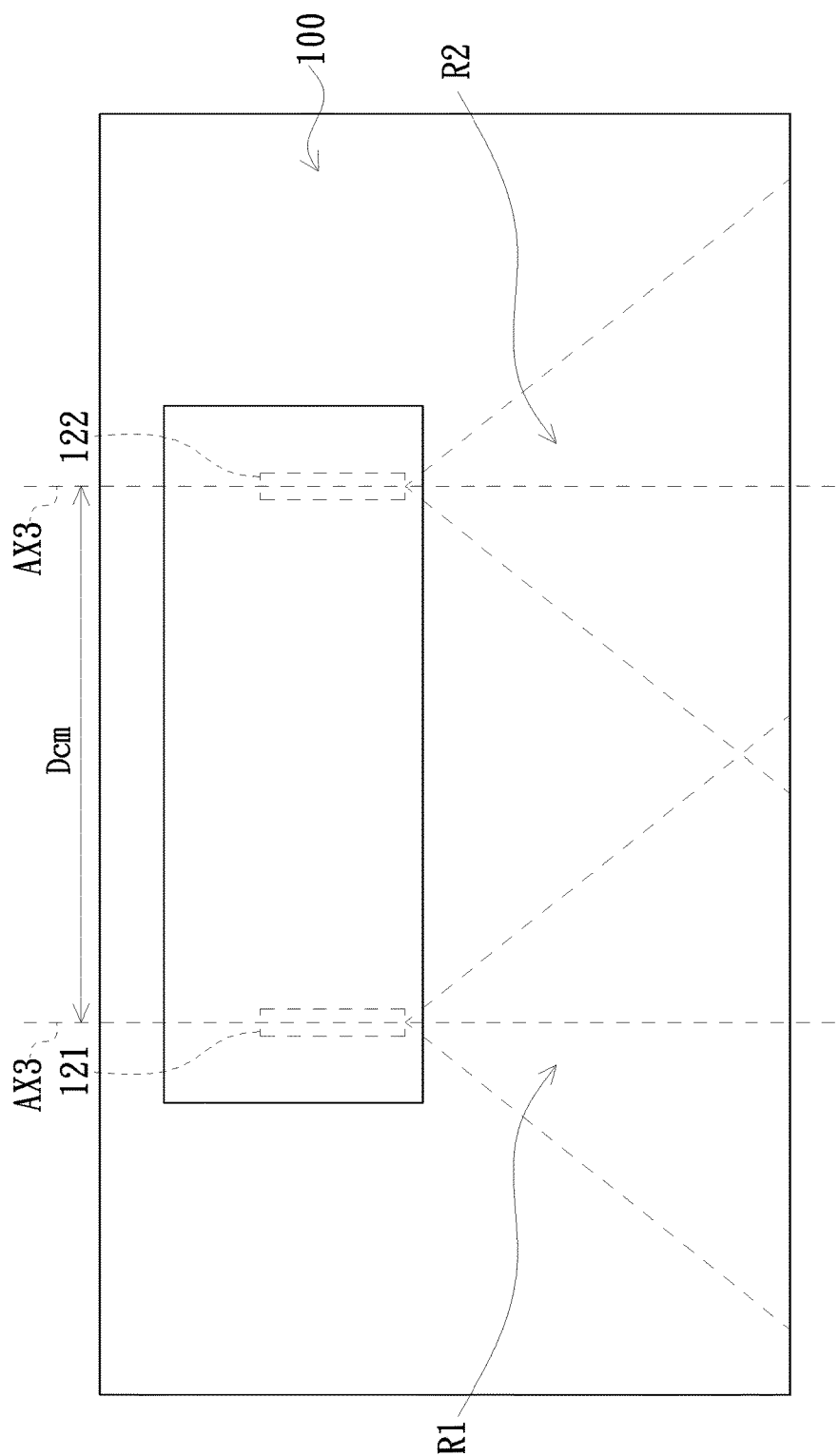
FIG. 8 is a schematic top view of a light emitting module of the projection apparatus shown in FIG. 7.
Figure 9:
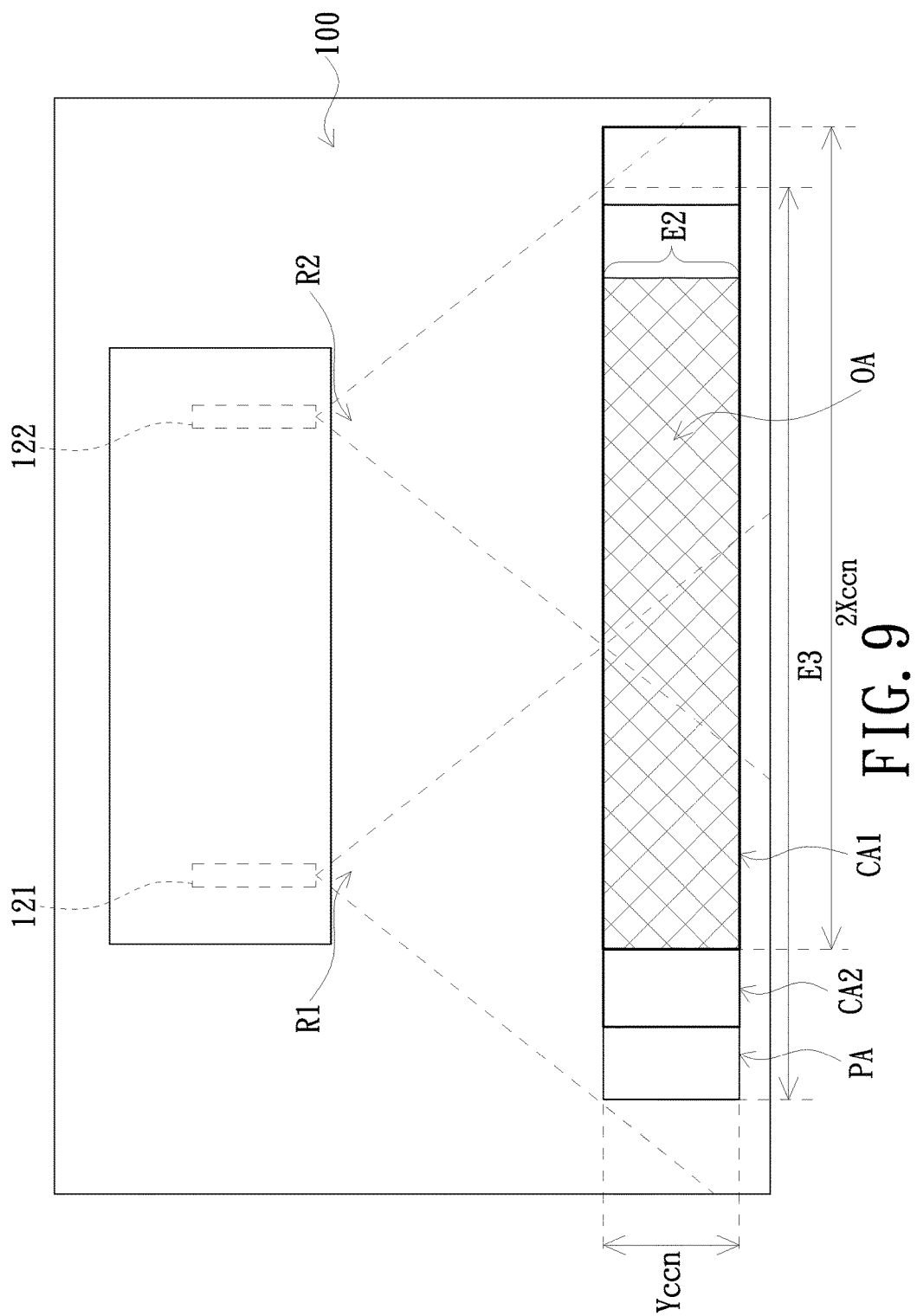
FIG. 9 is a schematic view of a projection area of an image projection module, a shooting area of a lens module and a sensing area of the light emitting module of the projection apparatus shown in FIG. 7.

Referring to FIGS. 7 to 9. FIG. 7 is a schematic structural view of a projection apparatus in accordance with another embodiment of the present invention. FIG. 8 is a schematic top view of a light emitting module of the projection apparatus shown in FIG. 7. FIG. 9 is a schematic view of a projection area of an image projection module, a shooting area of a lens module and a sensing area of the light emitting module of the projection apparatus shown in FIG. 7. As shown in FIGS. 7 to 9, the projection apparatus 1c of the present embodiment includes a base 13, and the projection apparatus 1c is placed on a bearing surface 100 by the base 13. The projection apparatus 1c further includes an image projection module 10, a lens module 11 and a light emitting module 12. The image projection module 10 has a first optical axis AX1. The image projection module 10 is for forming a projection area PA. Specifically, the image projection module 10 of the present embodiment projects images toward the bearing surface 100 for carrying the projection apparatus 1b to form the projection area PA. The first optical axis AX1 of the image projection module 10 has a first angle Δθcp between the positive projection of the projection apparatus 1b on a projection plane formed by the Y-axis and Z-axis and the Z-axis.

The lens module 11 is disposed on a side of the image projection module 10. The lens module 11 includes N" cameras. The N" cameras are located on the same side of the tilt direction of the image projection module 10 with respect to the Y-Z plane. Each of the N" cameras has a corresponding second optical axis AX2. The N" cameras form N" shooting areas CA1, CA2. In the present embodiment, the N" cameras are described by taking a first camera 111 and a second camera 112 as an example. However, the total number of cameras is not limited in the present invention, that is, the total number of cameras can be adjusted according to the actual situation. The second optical axis AX2 of the first camera 111 and the second optical axis AX2 of the second camera 112 each have a second angles Δθcn (Δθc1, Δθc2) with respect to the Z-axis. The first camera 111 and the second camera 112 are the same camera, and both have a shooting viewing angle θF1. The shooting viewing angle θF1 is twice of a shooting half-viewing angle θc of a camera. θcn is the angle between a shooting boundary and the second optical axis AX2 after the camera is tilted. Therefore, Δθc1=θc1−θc and Δθc2=θc2−θc. When Δθc1=0 or Δθc2=0, the shooting area CA1 or CA2 formed by the first camera 111 or the second camera 112 on the bearing surface 100 is a rectangle having a long side and a wide side corresponding to the base 13, wherein the length of the long side is 2Xccn (2Xcc1, 2Xcc2) and the length of the wide side is Yccn (Ycc1, Ycc2). In addition, the orthographic projections of the second optical axes AX2 of the first camera 111 and the second camera 112 have a tilt angle with respect to the X-Y projection plane on which the projection area PA is formed. That is, the first camera 111 and the second camera 112 each have a rotation axis perpendicular to the Y-Z projection plane, and the first camera 111 and the second camera 112 each can rotate about the rotation axis.

The light emitting module 12 is disposed in the base 13. The light emitting module 12 includes M" light emitting components. Each of the M" light emitting components has a corresponding third optical axis AX3. The M" light emitting components form M" shooting areas R1, R2. The first optical axis AX1 of the image projection module 10 is located between the M" sensing areas R1, R2. In the present embodiment, the M" light emitting components are described by taking a first light emitting component 121 and a second light emitting component 122 as an example. The distance between the first light emitting component 121 and the second light emitting component 122 is Dcm (Dc2). The sensing area formed by the light sources of the first light emitting component 121 and the second light emitting component 122 is a rectangle having a long side E3 and a wide side corresponding to the base 13. In the present embodiment, the length of the long side E3 is, for example, greater than or equal to 2 Dcm (2Ddc2). The projection area PA of the image projection module 10, the N" shooting areas CA1, CA2 of the lens module 11 and the M" sensing areas R1, R2 are at least partially overlapped with each other to form a rectangular shooting sensing area OA. The rectangular shooting sensing area OA has a long side and a wide side E2 corresponding to the base 13. In the present embodiment, the length of the wide side E2 is greater than or equal to the length Yccn (Ycc1, Ycc2) of the wide side of the shooting area CA1, CA2.

As shown in FIGS. 7 to 9, the image projection module 10 of the present embodiment projects an image toward the bearing surface 100 to form the projection area PA. The image projection module 10 and the bearing surface 100 have a first vertical distance Zcp. The first camera 111 and the bearing surface 100 have a second vertical distance Zccn (Zcc1). The projection pitch between the image projection module 10 and the first camera 111 on the Y-Z projection plane is Dcn (Dc1). The projection apparatus 1c further has a reference line L perpendicular to the bearing surface 100 and parallel to the Z-axis. In the present embodiment, the first optical axis AX1 of the image projection module 10 is tilted to the reference line L, and the second optical axis AX2 of the first camera 111 is tilted to the reference line L. The image projection module 10 and the reference line L have a first angle $\Delta\theta cp$. The second optical axis AX2 of the first camera 111 and the reference line L have a second angle $\Delta\theta c1$. When $\Delta\theta cp$ is not 0 (that is, the first optical axis AX1 of the image projection module 10 is tilted to the reference line L), the projection width of the projection length of the rectangular long side of the first optical axis AX1 on the tilted side to the reference line L on the Y-Z projection plane is Ycp+Ycp1, wherein Ycp+Ycp1=Dc1+$\Delta$Ycp1. When $\Delta\theta c1$ is not 0 (that is, the second optical axis AX2 is tilted to the reference line L), the projection width of the projection length of the rectangular long side of the second optical axis AX2 on the tilted side to the reference line L on the Y-Z projection plane is Yc+Yc1, wherein Yc+Yc1=Dc1+$\Delta$Yc1. When $\Delta\theta cp$=0, the first optical axis AX1 of the image projection module 10 is overlapped with the reference line L. The projected projection area of the image projection module 10 is a rectangular projection area. The projection of the wide side of the rectangular projection area on the Y-Z projection plane is 2Ycp.

In the present embodiment, it is to be noted that the first angle $\Delta\theta cp$ between the first optical axis AX1 of the image projection module 10 and the reference line L is a default value, and the value of the second angle $\Delta\theta cn$ ($\Delta\theta c1$) between the second optical axis AX2 of the first camera 111 and the reference line L on the Y-Z projection plane is a function of the distance Dcn (Dc1) between the image projection module 10 and the first camera 111 on the Y-Z projection plane and the second vertical distance Zccn (Zcc1) between the first camera 111 and the bearing surface 100. When the shooting area CA1 of the first camera 111 covers the projection area PA, the minimum value of the second angle $\Delta\theta cn$ satisfies the equation: $\Delta\theta cn=\theta cn-\theta c=cn-\frac{1}{2}\theta F1=\arctan((Yc+Ycn)/Zccn)-\arctan(Yc/Zccn)$, wherein n represents the N"th camera. Therefore, $\Delta\theta c1=\arctan((Yc+Yc1)/Zcc1)-\arctan(Yc/Zcc1)$.

As shown in FIGS. 7 to 9, the distance between the first light emitting component 121 and the second light emitting component 122 of the M" light emitting component in the present embodiment is Dcm (Dc2). The sensing area formed by the light sources of the first light emitting component 121 and the second light emitting component 122 is a rectangle having a long side E3 and a wide side corresponding to the base 13. In the present embodiment, the length of the long side E3 is, for example, greater than or equal to Dcm (Dc2). In addition, the shooting areas CA1 and CA2 formed by the first camera 111 and the second camera 112 of the present embodiment include the sensing areas R1 and R2 formed by the first light emitting component 121 and the second light emitting component 122.

Figure 10:
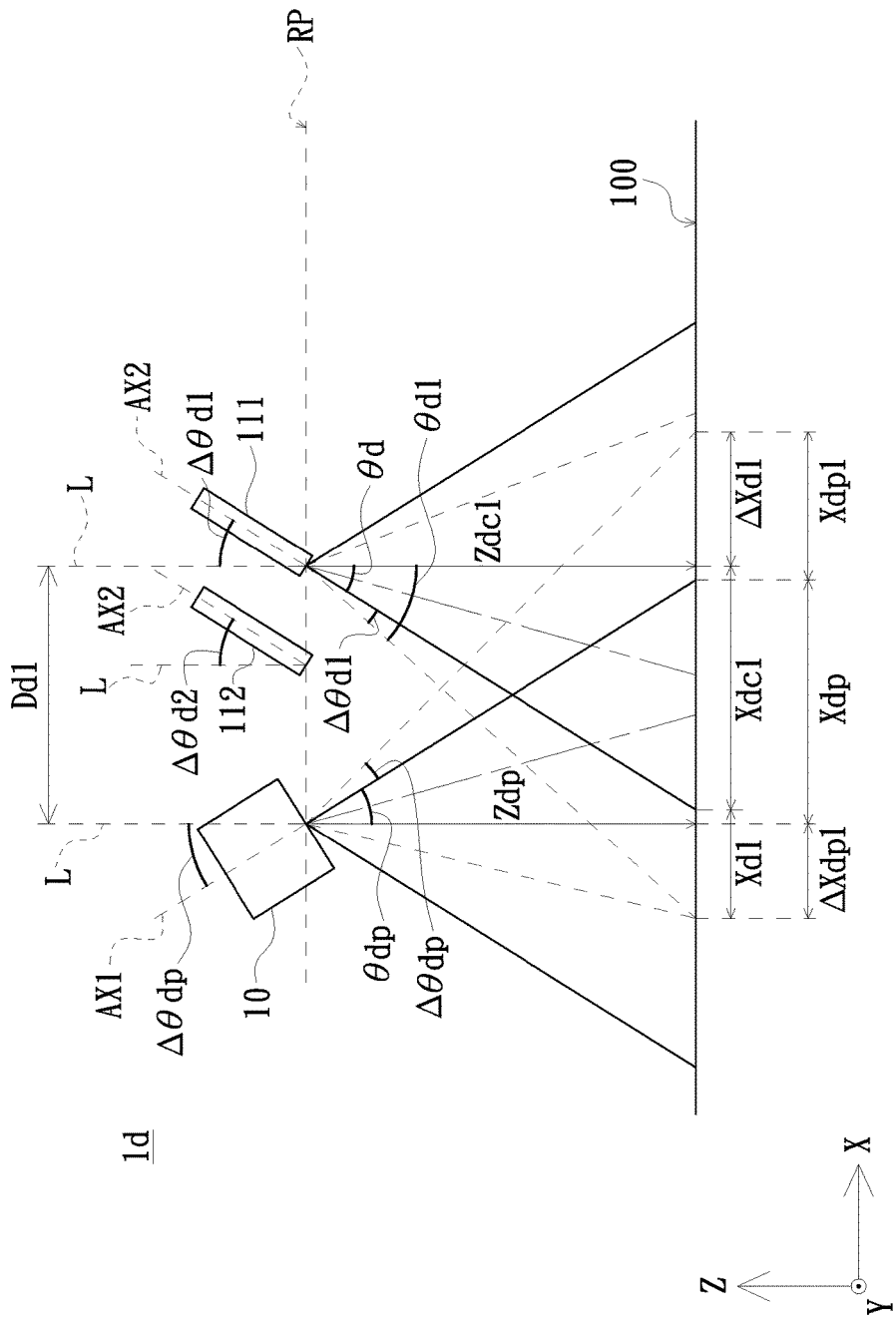
FIG. 10 is a schematic structural view of a projection apparatus in accordance with an embodiment of the present invention.
Figure 11:
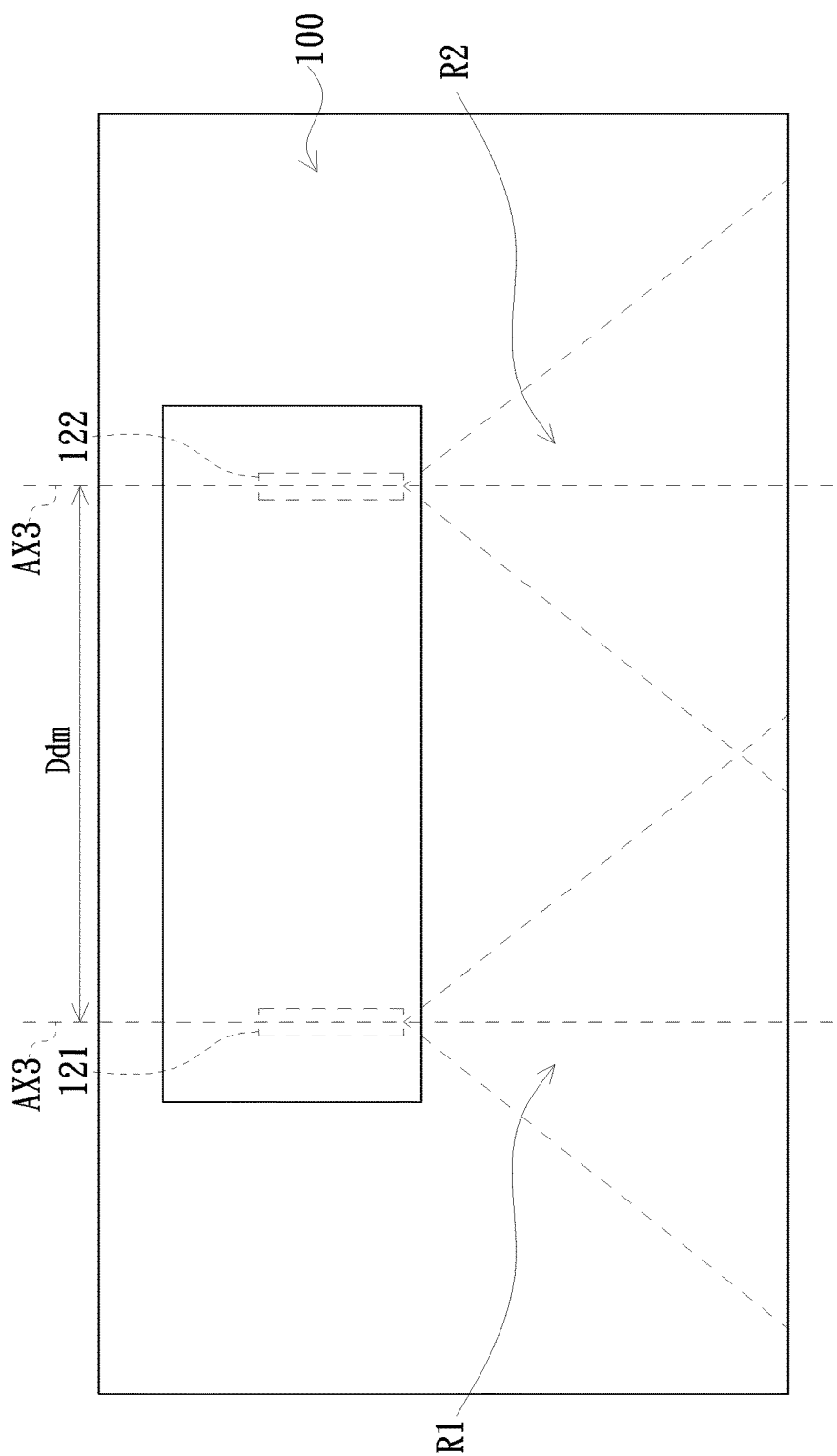
FIG. 11 is a schematic top view of a light emitting module of the projection apparatus shown in FIG. 10.
Figure 12:
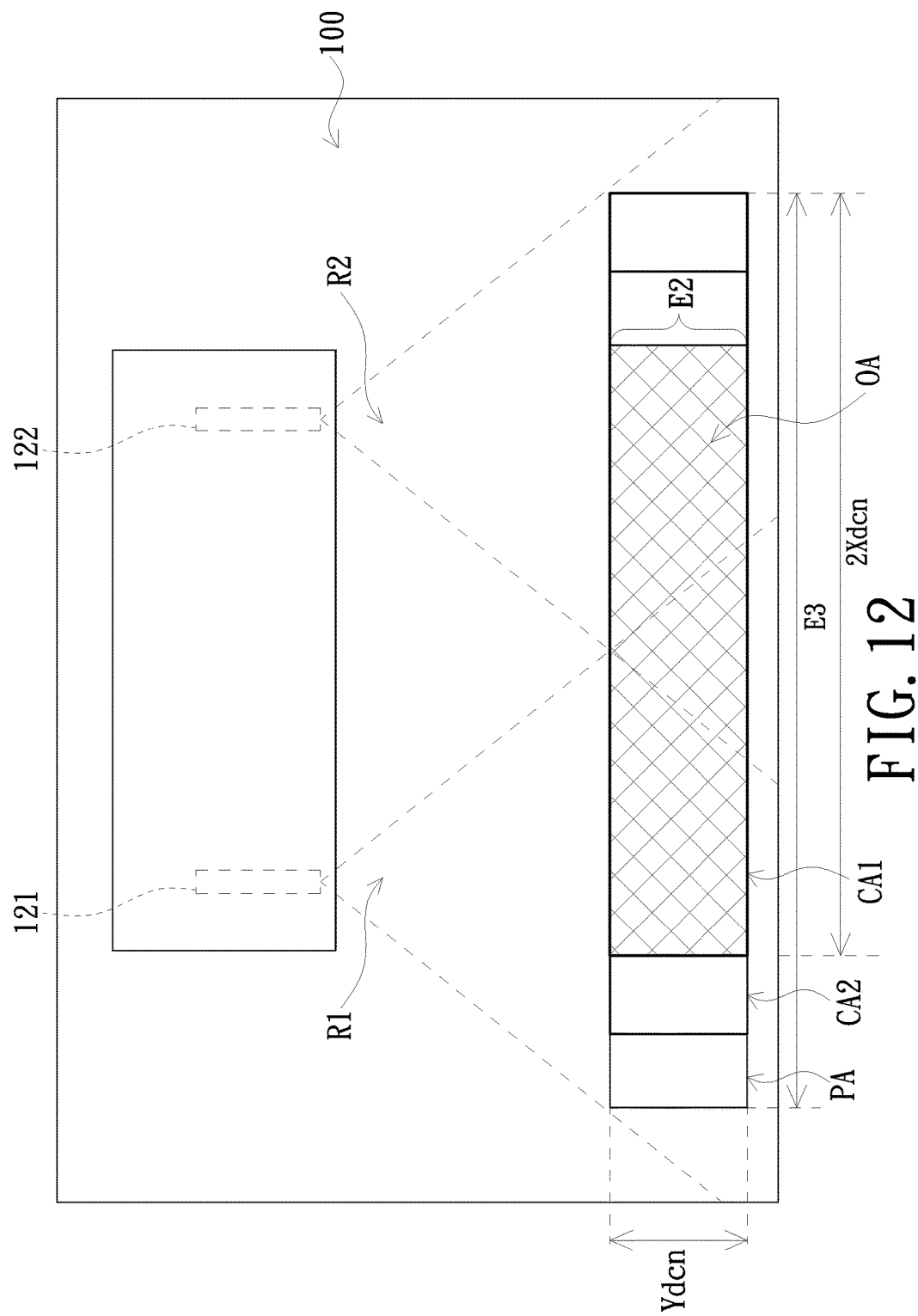
FIG. 12 is a schematic view of a projection area of an image projection module, a shooting area of a lens module and a sensing area of the light emitting module of the projection apparatus shown in FIG. 10.

Referring to FIGS. 10 to 12. FIG. 10 is a schematic structural view of a projection apparatus in accordance with an embodiment of the present invention. FIG. 11 is a schematic top view of a light emitting module of the projection apparatus shown in FIG. 10. FIG. 12 is a schematic view of a projection area of an image projection module, a shooting area of a lens module and a sensing area of the light emitting module of the projection apparatus shown in FIG. 10. As shown in FIGS. 10 to 12, the first optical axis AX1 of the image projection module 10 has a first angle $\Delta\theta dp$ between the positive projection of the projection apparatus 1d on a projection plane formed by the X-axis and Z-axis and the Z-axis. The first camera 111 and the second camera 112 of the lens module 11 are located on the same side of the tilt direction of the image projection module 10 with respect to the X-Z plane. In the present embodiment, the second optical axis AX2 of the first camera 111 and the Z-axis have a second angle $\Delta\theta dn$ ($\Delta\theta d1$); and the second angle $\Delta\theta dn$ ($\Delta\theta d2$) between the second camera 112 and the Z-axis is 0. Since the second angle $\Delta\theta dn$ ($\Delta\theta d2$) between the second camera 112 and the Z-axis is 0, the shooting area CA1, CA2 formed by the first camera 1111 and the second camera 112 in the bearing surface 100 is a rectangle having a long side and wide side corresponding to the base 13. The length of the wide side is Ydcn (Ydc1, Ydc2), and the length of the long side is 2Xdcn (Xdc1, Xdc2).

The light emitting module 12 of the present embodiment includes M''' light emitting components. Each of the M''' light emitting components has a corresponding third optical axis AX3. The M''' light emitting components form M''' shooting areas R1, R2. The first optical axis AX1 of the image projection module 10 is located between the M''' sensing areas. In the present embodiment, the M''' light emitting components are described by taking a first light emitting component 121 and a second light emitting component 122 as an example. The distance between the first light emitting component 121 and the second light emitting component 122 is Ddm (Dd1). The sensing area formed by the light sources of the M''' light emitting components has a long side E3 and a wide side corresponding to the base 13. In the present embodiment, the length of the long side E3 is, for example, greater than or equal to 2 Ddm (2Dd1). The projection area PA of the image projection module 10, the N''' shooting areas CA1, CA2 of the lens module 11 and the M''' sensing areas R1, R2 are at least partially overlapped with each other to form a rectangular shooting sensing area OA. The rectangular shooting sensing area OA has a long side and a wide side E2 corresponding to the base 13. In the present embodiment, the length of the wide side E2 is greater than or equal to the length Ydcn (Ydc1, Ydc2) of the wide side of the shooting area CA1, CA2.

As shown in FIGS. 10 to 12, the projection apparatus 1d of the present embodiment further has a reference plane RP. The image projection module 10 and the lens module 11 are located on the same reference plane RP. Specifically, the image projection module 10, the first camera 111 and the second camera 112 are located on the same reference plane RP. The reference plane RP is parallel to the bearing surface 100 for example; that is, the image projection module 10 has a first vertical distance Zap with respect to the bearing surface 100, and the first camera 111 and the bearing surface 100 each have a second vertical distance Zdcn (Zdc1) with respect to the bearing surface 100. In the present embodiment, the first vertical distance Zdp and the second vertical distance Zdcn (Zdc1) are equal to each other, but the present invention is not limited thereto. In other embodiments, the first vertical distance Zdp and the second vertical distance Zdcn (Zdc1) are not equal to each other for example. The distance between the image projection module 10 and the first camera 111 is Dd1. Specifically, the distance Dd1 between the image projection module 10 and the first camera 111 is the distance between the first optical axis AX1 of the image projection module 10 and the second optical axis AX2 of the first camera 111. At least one of the first camera 111 and the second camera 112 is a color camera. In addition, the viewing angle $\theta F1$ of the image projection module 10 of the present embodiment is smaller than or equal to the viewing angle $\theta F2$ of the N'''th camera.

As shown in FIGS. 10 to 12, the projection apparatus 1a of the present embodiment further has a reference line L perpendicular to the bearing surface and parallel to Z-axis. The image projection module 10 has a projection viewing angle $2\theta dp$. The first camera 111 and the second camera 112 are the same camera, and both have a shooting viewing angle $\theta d$. $\theta a1$ is the angle between a shooting boundary and the second optical axis AX2 after the camera is tilted. In the present embodiment, the first optical axis AX1 of the image projection module 10 is tilted to the reference line L, and the second optical axis AX2 of the first camera 111 is tilted to the reference line L. The image projection module 10 and the reference line L have a first angle $\Delta\theta dp$. The second optical axis AX2 of the first camera 111 and the reference line L have a second angle $\Delta\theta dn$ ($\Delta\theta d1$), therefore, $\Delta\theta d1=\theta d1-\theta d$ and $\Delta\theta d2=\theta d2-\theta d$. When $\Delta\theta dp=0$, the first optical axis AX1 of the image projection module 10 is overlapped with the reference line L. The projected projection area of the image projection module 10 is a rectangular projection area. The projection of the long side of the rectangular projection area on the X-Z projection plane is $2Xdp$. When $\Delta\theta dp$ is not 0 (that is, the first optical axis AX1 is tilted to the reference line L), the projection width of the projection length of the rectangular distal wide side of the first optical axis AX1 on the tilted side to the reference line L on the X-Z projection plane is $Xdp+Xdp1$, wherein $Xdp+Xdp1=Dd1+\Delta Xd1$. When $\Delta\theta d1$ is not 0 (that is, the second optical axis AX2 is tilted to the reference line L), the projection width of the projection length of the rectangular distal wide side of the second optical axis AX2 on the tilted side to the reference line L on the X-Z projection plane is $Xd+Xd1$, wherein $Xd+Xd1=Dd1+\Delta Xdp1$.

In the present embodiment, it is to be noted that the first angle $\Delta\theta dp$ between the first optical axis AX1 of the image projection module 10 and the reference line L is a default value, and the value of the second angle $\Delta\theta dn$ between the second optical axis AX2 of the first camera 111 and the reference line L on the X-Z projection plane is a function of the distance $Ddn$ between the image projection module 10 and the first camera 111 on the X-Z projection plane and the second vertical distance $Zdcn$ between the first camera 111 and the bearing surface 100. When the shooting area CA1 of the first camera 111 covers the projection area PA, the minimum value of the second angle $\Delta\theta dn$ satisfies the equation: $\Delta\theta dn=\arctan((Xd+Xdn)/Zdcn)-\arctan(Xd/Zdcn)$, wherein n represents the $N'''$th camera. Therefore, $\Delta\theta d1=\arctan((Xd+Xd1)/Zdc1)-\arctan(Xd/Zdc1)$.

In summary, according to the structural design in which the second optical axis of the plurality of lens modules is tilted to the first optical axis of the image projection module, the third optical axis of the plurality of light emitting modules is tilted to each other, and the projection area, the shooting areas and the sensing areas are at least partially overlapped with each other, the sensing performance of the projection apparatus of the embodiments of the present invention is improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A projection apparatus having a base and disposed on a bearing surface, the projection apparatus comprising:

an image projection module, having a first optical axis and for forming a projection area on the bearing surface, wherein a projection of the first optical axis on a X-Z projection plane of the projection apparatus is perpendicular to a X-Y projection plane of the projection apparatus, and the projection area is formed on the X-Y projection plane;

a lens module, disposed on a side of the image projection module, wherein the lens module comprises N cameras, the N cameras each have a corresponding second optical axis and are for forming N shooting areas respectively, the N second optical axes are tilted to the first optical axis and have N angles with respect to the X-Z projection plane respectively, a Nth angle among the N angles is $\Delta\theta an$, and the projection area is at least partially overlapped with the N shooting areas to form an overlapping area, wherein when the $\Delta\theta an$ corresponding to a Nth camera among the N cameras is 0 degree, a Nth shooting area corresponding to the Nth camera on the bearing surface is a rectangle having a long side and a wide side corresponding to the base, a length of the wide side of the Nth shooting area is $Yacn$, and a length of the long side of the Nth shooting area is $2Xacn$; and a light emitting module, comprising M light emitting components, wherein the M light emitting components each have a corresponding third optical axis and are for forming M sensing areas respectively, the first optical axis is located between the M sensing areas, wherein the projection area, the N shooting areas and the M sensing areas are at least partially overlapped with each other to form a rectangular shooting sensing area, the rectangular shooting sensing area has a long side and a wide side corresponding to the base, and a length of the wide side of the rectangular shooting sensing area is greater than or equal to $Yacn$.

2. The projection apparatus according to claim 1, further having a reference plane, wherein both of the image projection module and the lens module are located on the reference plane.

3. The projection apparatus according to claim 1, wherein the image projection module and the bearing surface have a first vertical distance $Zap$, a length of a long side of a projection of the image projection module on the X-Y projection plane is $2Xap$, the Nth camera and the bearing surface have a second vertical distance $Zacn$, and a distance between the image projection module and the Nth camera is $Dan$.

4. The projection apparatus according to claim 1, wherein the N cameras are linearly arranged.

5. The projection apparatus according to claim 3, wherein a value of the Nth angle $\Delta\theta an$ on the X-Z projection plane is a function of the distance between the image projection module and the Nth camera, wherein when the shooting area of the Nth camera covers the projection area, a minimum value of the $\Delta\theta an$ is $\arctan((Dan+Xap)/Zacn)-\arctan(Xacn/Zacn)$.

6. The projection apparatus according to claim 1, wherein a size of the shooting area of at least one of the N cameras is different from sizes of the shooting areas of the other cameras.

7. The projection apparatus according to claim 1, wherein the N cameras are disposed on two sides of or around the image projection module.

8. The projection apparatus according to claim 1, wherein the N cameras are vertically arranged with the image projection module.

9. The projection apparatus according to claim 1, wherein a distance between a first light emitting component and a Mth light emitting component among the M light emitting components is Dam, the shooting sensing area formed by light sources of the M light emitting components is a rectangle having a long side and a wide side corresponding to the base, and a length of the long side of the shooting sensing area is greater than or equal to 2 Dam.

10. The projection apparatus according to claim 1, wherein the shooting areas formed by the N cameras comprise the sensing areas formed by the M light emitting components.

11. The projection apparatus according to claim 1, wherein the N cameras of the lens module comprise a first camera and a second camera, the first camera is a color camera, the second camera is an infrared camera, and the light emitting module is an infrared emitting module.

12. The projection apparatus according to claim 1, wherein a projection of the first optical axis of the image projection module on a Y-Z projection plane of the projection apparatus is tilted by an angle with respect to the X-Y projection plane on which the projection area is formed.

13. The projection apparatus according to claim 1, wherein a projection of the second optical axis of the Nth camera on a Y-Z projection plane of the projection apparatus is tilted by an angle with respect to the X-Y projection plane on which the projection area is formed.

14. A projection apparatus having a base and disposed on a bearing surface, the projection apparatus comprising:
an image projection module, having a first optical axis and for forming a projection area on the bearing surface, wherein a projection of the first optical axis on a Y-Z projection plane of the projection apparatus has a first angle $\Delta\theta bp$ with respect to a Z-axis of the projection apparatus;
a lens module, disposed on a side opposite to a tilt direction of the image projection module with respect to the Y-Z projection plane, wherein the lens module comprises N' cameras, the N' cameras each have a second optical axis and are for forming N' shooting areas respectively, the second optical axis and the Z-axis have a second angle $\Delta\theta bn$, the projection area is at least partially overlapped with the shooting areas to form an overlapping area, wherein when the second angle $\Delta\theta bn$ corresponding to a Nth camera among the N cameras is 0 degree, a Nth shooting area corresponding to the Nth camera on the bearing surface is a rectangle having a long side and a wide side corresponding to the base, a length of the wide side of the Nth shooting area is Ybcn, and a length of the long side of the Nth shooting area is 2Xbcn; and
a light emitting module, comprising M' light emitting components, wherein the M' light emitting components each have a corresponding third optical axis and are for forming M' sensing areas respectively, the first optical axis is located between the M' sensing areas, wherein the projection area, the N' shooting areas and the M' sensing areas are at least partially overlapped with each other to form a rectangular shooting sensing area, the rectangular shooting sensing area has a long side and a wide side corresponding to the base, and a length of the wide side of the rectangular shooting sensing area is greater than or equal to Ybcn.

15. The projection apparatus according to claim 14, wherein the image projection module projects an image toward the bearing surface to form the projection area, the image projection module and the bearing surface have a first vertical distance Zbp, a N'th camera among the N' cameras and the bearing surface have a second vertical distance Zbcn, a projection pitch of a distance between the image projection module and the N'th camera on the Y-Z projection plane is Dbn, wherein the projection apparatus further comprises a reference line perpendicular to the bearing surface, both of the first optical axis of the image projection module and the second optical axis of the N'th camera are tilted to the reference line, the second optical axis of the N'th camera and the reference line have the second angle $\Delta\theta bn$, wherein when the first angle $\Delta\theta bp$ is 0 degree, the projection area projected by the image projection module is a rectangle, and a length of a projection of a wide side of the rectangular projection area on the Y-Z projection plane is 2Ybp.

16. The projection apparatus according to claim 15, wherein when the image projection module is tilted to the first optical axis, a projection of a distance between of a long side of the rectangular projection area on a tilted side of the first optical axis to the reference line on the Y-Z projection plane is Ybp+$\Delta$Ybcn.

17. The projection apparatus according to claim 16, wherein the first angle $\Delta\theta bp$ between the first optical axis of the image projection module and the reference line is a default value, a value of the second angle $\Delta\theta bn$ between the second optical axis of the N'th camera on the Y-Z projection plane and the reference line is a function of the distance Dbn between the image projection module and the N'th camera on the Y-Z projection plane and of the second vertical distance Zbcn between the N'th camera and the bearing surface, wherein when the shooting area of the N'th camera covers the projection area, a minimum value of the $\Delta\theta bn$ is arctan((Dbn+$\Delta$Ybcn+Ybp)/Zbcn)−arctan(Ybcn/Zbcn).

18. The projection apparatus according to claim 14, further comprising a reference plane, wherein both of the image projection module and the N' cameras are located on the reference plane.

19. The projection apparatus according to claim 14, wherein a viewing angle of the image projection module is less than or equal to a viewing angle of a N'th camera among the N' cameras.

20. The projection apparatus according to claim 14, wherein the N' cameras comprise at least one color camera.

21. The projection apparatus according to claim 14, wherein a size of the shooting area of at least one of the N' cameras is different from sizes of the shooting areas of the other cameras.

22. The projection apparatus according to claim 14, wherein the N' cameras are disposed on the side opposite to a skew angle of the image projection module.

23. The projection apparatus according to claim 14, wherein a distance between a first light emitting component and a M'th light emitting component among the M' light emitting components is Dbm, the shooting sensing area formed by light sources of the M' light emitting components is a rectangle having a long side and a wide side corresponding to the base, and a length of the long side of the rectangle is greater than or equal to 2 Dbm.

24. The projection apparatus according to claim 14, wherein the shooting areas formed by the N' cameras comprise the sensing areas formed by the M' light emitting components.

25. The projection apparatus according to claim 14, wherein a projection of the second optical axis of a N'th camera among the N' cameras on a X-Z projection plane of the projection apparatus is tilted by an angle with respect to a X-Y projection plane on which the projection area is formed.

26. A projection apparatus having a base and disposed on a bearing surface, the projection apparatus comprising:
   an image projection module, having a first optical axis and for forming a projection area on the bearing surface, wherein a projection of the first optical axis on a Y-Z projection plane of the projection apparatus has a first angle $\Delta\theta cp$ with respect to a Z-axis of the projection apparatus;
   a lens module, disposed on a side identical to a tilt direction of the image projection module with respect to the Y-Z projection plane, wherein the lens module comprises N" cameras, the N" cameras each have a second optical axis and are for forming N" shooting areas respectively, the second optical axis and the Z-axis have a second angle $\Delta\theta cn$, the projection area is at least partially overlapped with the shooting areas to form an overlapping area, wherein when the second angle $\Delta\theta cn$ corresponding to a Nth camera among the N" cameras is 0 degree, a Nth shooting area corresponding to the Nth camera on the bearing surface is a rectangle having a long side and a wide side corresponding to the base, a length of the wide side of the Nth shooting area is Yccn, and a length of the long side of the Nth shooting area is 2Xccn; and
   a light emitting module, comprising M" light emitting components, wherein the M" light emitting components each have a corresponding third optical axis and are for forming M" sensing areas respectively, the first optical axis is located between the M" sensing areas, wherein the projection area, the N" shooting areas and the M" sensing areas are at least partially overlapped with each other to form a rectangular shooting sensing area, the rectangular shooting sensing area has a long side and a wide side corresponding to the base, and a length of the wide side of the rectangular shooting sensing area is greater than or equal to Yccn.

27. The projection apparatus according to claim 26, wherein the image projection module projects an image toward the bearing surface to form the projection area, the image projection module and the bearing surface have a first vertical distance Zcp, a N"th camera among the N" cameras and the bearing surface have a second vertical distance Zccn, a projection pitch of a distance between the image projection module and the N"th camera on the Y-Z projection plane is Dcn, wherein the projection apparatus further comprises a reference line perpendicular to the bearing surface, both of the first optical axis of the image projection module and the second optical axis of the N"th camera are tilted to the reference line, the second optical axis of the N"th camera and the reference line have the second angle $\Delta\theta cn$, wherein when the image projection module is tilted to the first optical axis, a projection of a distance between of a long side of a rectangular projection area on a tilted side of the first optical axis to the reference line on the Y-Z projection plane is Ycp+Ycp1, wherein a width of Ycp+Ycp1 is equal to Dcn+$\Delta$Ycp1, wherein when the N"th camera is tilted to the respective second optical axis, a projection of a distance between of the long side of the rectangular projection area on a tilted side of the second optical axis to the reference line on the Y-Z projection plane is Yc+Ycn, wherein a width of Yc+Ycn is equal to Dcn+$\theta$Ycn, wherein when the first angle $\Delta\theta cp$ is 0 degree, the projection area projected by the image projection module is a rectangle, and a length of a projection of a wide side of the rectangular projection area on the Y-Z projection plane is 2Ycp.

28. The projection apparatus according to claim 26, further comprising a reference plane, wherein both of the image projection module and the N" cameras are located on the reference plane.

29. The projection apparatus according to claim 26, wherein a viewing angle of the image projection module is less than or equal to a viewing angle of a N"th camera among the N" cameras.

30. The projection apparatus according to claim 27, wherein the first angle $\Delta\theta cp$ between the first optical axis of the image projection module and the reference line is a default value, a value of the second angle $\Delta\theta cn$ between the second optical axis of the N"th camera on the Y-Z projection plane and the reference line is a function of the distance Dcn between the image projection module and the N"th camera on the Y-Z projection plane and of the second vertical distance Zccn between the N"th camera and the bearing surface, wherein when the shooting area of the N"th camera covers the projection area, a minimum value of the $\Delta\theta cn$ is $\arctan((Yc+Ycn)/Zccn)-\arctan(Yc/Zccn)$.

31. The projection apparatus according to claim 26, wherein the N" cameras comprise at least one color camera.

32. The projection apparatus according to claim 26, wherein a size of the shooting area of at least one of the N" cameras is different from sizes of the shooting areas of the other cameras.

33. The projection apparatus according to claim 26, wherein a distance between a first light emitting component and a M"th light emitting component among the M" light emitting components is Dcm, the shooting sensing area formed by light sources of the M" light emitting components is a rectangle having a long side and a wide side corresponding to the base, and a length of the long side of the rectangle is greater than or equal to 2 Dcm.

34. The projection apparatus according to claim 26, wherein the shooting areas formed by the N" cameras comprise the sensing areas formed by the M" light emitting components.

35. The projection apparatus according to claim 26, wherein a projection of the second optical axis of a N"th camera among the N" cameras on a X-Z projection plane of the projection apparatus is tilted by an angle with respect to a X-Y projection plane on which the projection area is formed.

36. A projection apparatus having a base and disposed on a bearing surface, the projection apparatus comprising:
   an image projection module, having a first optical axis and for forming a projection area, wherein a projection of the first optical axis on a X-Z projection plane of the projection apparatus has a first angle $\Delta\theta dp$ with respect to a Z-axis of the projection apparatus;
   a lens module, disposed on a side identical to a tilt direction of the image projection module with respect to the X-Z projection plane, wherein the lens module comprises N'" cameras, the Nu cameras each have a second optical axis and are for forming Nu shooting areas respectively, the second optical axis and the Z-axis have a second angle $\Delta\theta dn$, the projection area is at least partially overlapped with the shooting areas to form an overlapping area, wherein when the second angle $\Delta\theta dn$ corresponding to a Nth camera among the N'" cameras is 0 degree, a Nth shooting area corresponding to the Nth camera on the bearing surface is a rectangle having a long side and a wide side corresponding to the base, a length of the wide side of the Nth shooting area is Ydcn, and a length of the long side of the Nth shooting area is 2Xdcn; and a light emitting module, comprising M''' light emitting components, wherein the M''' light emitting components each have a corresponding third optical axis and are for forming M''' sensing areas respectively, the first optical axis is located between the M''' sensing areas, wherein the projection area, the N''' shooting areas and the M''' sensing areas are at least partially overlapped with each other to form a rectangular shooting sensing area, the rectangular shooting sensing area has a long side and a wide side corresponding to the base, and a length of the wide side of the rectangular shooting sensing area is greater than or equal to Ydcn.

37. The projection apparatus according to claim 36, wherein the image projection module projects an image toward the bearing surface to form the projection area, the image projection module and the bearing surface have a first vertical distance Zdp, a N'''th camera among the N''' cameras and the bearing surface have a (N'''+1)th vertical distance Zdcn, a projection pitch of a distance between the image projection module and the N'''th camera on the X-Z projection plane is Ddn, wherein the projection apparatus further comprises a reference line perpendicular to the bearing surface, both of the first optical axis of the image projection module and the second optical axis of the N'''th camera are tilted to the reference line, the second optical axis of the N'''th camera and the reference line have the second angle $\Delta\theta dn$, wherein when the first angle $\Delta\theta dp$ is 0 degree, the projection area projected by the image projection module is a rectangle, and a length of a projection of a wide side of the rectangular projection area on the X-Z projection plane is 2Xdp, wherein when the image projection module is tilted to the first optical axis, a projection of a distance between of a distal wide side of the rectangular projection area on a tilted side of the first optical axis to the reference line on the X-Z projection plane is Xdp+Xdpn, wherein a width of Xdp+Xdpn is equal to Ddn+$\Delta$Xdn, wherein when the N'''th camera is tilted to the respective second optical axis, a projection of a distance between of the distal wide side of the rectangular projection area on a tilted side of the second optical axis to the reference line on the X-Z projection plane is Xdcn+Xdn, wherein a width of Xdcn+Xdn is equal to Ddn+$\Delta$Xdpn.

38. The projection apparatus according to claim 37, wherein the first angle $\Delta\theta dp$ between the first optical axis of the image projection module and the reference line is a default value, a value of the second angle $\Delta\theta dn$ between the second optical axis of the N'''th camera on the X-Z projection plane and the reference line is a function of the distance Ddn between the image projection module and the N'''th camera on the X-Z projection plane and of the second vertical distance Zdcn between the N'''th camera and the bearing surface, wherein when the shooting area of the N'''th camera covers the projection area, a minimum value of the $\Delta\theta dn$ is arctan((Xdcn+Xdn)/Zdcn)−arctan(Xdcn/Zdcn).

39. The projection apparatus according to claim 36, further comprising a reference plane, wherein both of the image projection module and the N''' cameras are located on the reference plane.

40. The projection apparatus according to claim 36, wherein a viewing angle of the image projection module is less than or equal to a viewing angle of a N'''th camera among the N''' cameras.

41. The projection apparatus according to claim 36, wherein the N''' cameras comprise at least one color camera.

42. The projection apparatus according to claim 36, wherein a size of the shooting area of at least one of the N''' cameras is different from sizes of the shooting areas of the other cameras.

43. The projection apparatus according to claim 36, wherein a distance between a first light emitting component and a M'''th light emitting component among the M''' light emitting components is Ddm, the shooting sensing area formed by light sources of the M''' light emitting components is a rectangle having a long side and a wide side corresponding to the base, and a length of the long side of the rectangle is greater than or equal to 2 Ddm.

44. The projection apparatus according to claim 36, wherein the shooting areas formed by the N''' cameras comprise the sensing areas formed by the M''' light emitting components.

45. The projection apparatus according to claim 36, wherein a projection of the second optical axis of a N'''th camera among the N''' cameras on a Y-Z projection plane of the projection apparatus is tilted by an angle with respect to a X-Y projection plane on which the projection area is formed.

* * * * *